(12) United States Patent
Bobbitt et al.

(10) Patent No.: US 7,693,844 B1
(45) Date of Patent: Apr. 6, 2010

(54) CONFIGURING PROCESSING RELATIONSHIPS AMONG ENTITIES OF AN ORGANIZATION

(75) Inventors: Charles P. Bobbitt, Plano, TX (US); Steven G. Doughty, Plano, TX (US)

(73) Assignee: Computer Sciences Corporation, El Segundo, CA (US)

( * ) Notice: Subject to any disclaimer, the term of this patent is extended or adjusted under 35 U.S.C. 154(b) by 1652 days.

(21) Appl. No.: 09/699,036

(22) Filed: Oct. 27, 2000

Related U.S. Application Data

(60) Provisional application No. 60/162,412, filed on Oct. 29, 1999.

(51) Int. Cl.
G06F 7/00 (2006.01)
G06F 17/00 (2006.01)

(52) U.S. Cl. .......................... 707/100; 707/1; 707/102; 707/103 R

(58) Field of Classification Search ................. 705/39, 705/1, 5, 35, 44; 707/100, 103 R, 1, 102; 715/513, 533; 711/216, 217
See application file for complete search history.

(56) References Cited

U.S. PATENT DOCUMENTS

| | | | |
|---|---|---|---|
| 4,606,002 A | | 8/1986 | Waisman et al. |
| 4,878,167 A | | 10/1989 | Kapulka et al. |
| 5,099,422 A | | 3/1992 | Foresman et al. |
| 5,191,522 A | * | 3/1993 | Bosco et al. ................... 705/4 |
| 5,201,044 A | | 4/1993 | Frey, Jr. et al. |
| 5,233,513 A | | 8/1993 | Doyle |
| 5,249,284 A | | 9/1993 | Kass et al. |
| 5,257,366 A | | 10/1993 | Adair et al. |

(Continued)

FOREIGN PATENT DOCUMENTS

EP 0 280 773 9/1988

(Continued)

OTHER PUBLICATIONS

Costa G.H.A.; Tanaka A.K.; and Campos, M. L. M.; "Design environment for business rules in databases"; Dept. de Eng. de Sistemas, Inst. Militar de Engenharia, Rio de Janeiro, Brazil; 1998; p. 1.*

(Continued)

*Primary Examiner*—Ella Colbert
(74) *Attorney, Agent, or Firm*—Meyertons, Hood, Kivlin, Kowert & Goetzel, P.C.; Eric B. Meyertons

(57) ABSTRACT

A system, method and carrier medium for configuring processing relationships among entities of a Financial Service Organization (FSO). The system, method and carrier medium may be used for processing and reporting FSO business data including transactional data. A business structure, which may include the processing relationship between various entities of the FSO, may be defined. A processing relationship configuration program may be used to create a processing relationship structure. A node may be created and uniquely defined to represent an FSO physical entity and/or an FSO function. Nodes structures may be defined to correspond to the processing relationship structure within an FSO. A node number may uniquely identify a node instance in the processing relationship structure. An FSO database table may be used to store the a processing relationship structure information. FSO transactions, such as executing a report, may be generated based on the defined processing relationship structure.

70 Claims, 12 Drawing Sheets

U.S. PATENT DOCUMENTS

| | | | |
|---|---|---|---|
| 5,386,566 A | | 1/1995 | Hamanaka et al. |
| 5,386,571 A | * | 1/1995 | Kurz .......................... 707/100 |
| 5,394,555 A | | 2/1995 | Hunter et al. |
| 5,421,011 A | * | 5/1995 | Camillone et al. .......... 718/104 |
| 5,434,994 A | | 7/1995 | Shaheen et al. |
| 5,455,947 A | | 10/1995 | Suzuki et al. |
| 5,483,632 A | | 1/1996 | Kuwamoto et al. |
| 5,495,608 A | | 2/1996 | Antoshenkov |
| 5,499,330 A | | 3/1996 | Lucas et al. |
| 5,504,674 A | | 4/1996 | Chen et al. |
| 5,513,348 A | * | 4/1996 | Ryu et al. ....................... 707/1 |
| 5,523,942 A | | 6/1996 | Tyler et al. |
| 5,524,205 A | | 6/1996 | Lomet et al. |
| 5,550,976 A | | 8/1996 | Henderson et al. |
| 5,586,310 A | | 12/1996 | Sharman |
| 5,594,899 A | | 1/1997 | Knudsen et al. |
| 5,615,309 A | * | 3/1997 | Bezek et al. ................... 706/50 |
| 5,623,629 A | | 4/1997 | Suzuki |
| 5,638,508 A | | 6/1997 | Kanai et al. |
| 5,689,706 A | | 11/1997 | Rao et al. |
| 5,710,915 A | | 1/1998 | McElhiney |
| 5,721,915 A | | 2/1998 | Sockut et al. |
| 5,732,397 A | | 3/1998 | De Tore et al. |
| 5,742,820 A | | 4/1998 | Perlman |
| 5,745,901 A | | 4/1998 | Entner et al. |
| 5,761,531 A | | 6/1998 | Ohmura et al. |
| 5,768,505 A | | 6/1998 | Gilchrist et al. |
| 5,768,506 A | | 6/1998 | Randell |
| 5,794,229 A | | 8/1998 | French et al. |
| 5,797,134 A | | 8/1998 | McMillan et al. |
| 5,832,481 A | | 11/1998 | Sheffield |
| 5,864,679 A | | 1/1999 | Kanai et al. |
| 5,867,494 A | | 2/1999 | Krishnaswamy et al. |
| 5,870,711 A | | 2/1999 | Huffman |
| 5,870,725 A | | 2/1999 | Bellinger et al. |
| 5,870,746 A | | 2/1999 | Knutson et al. |
| 5,873,066 A | | 2/1999 | Underwood et al. |
| 5,881,379 A | * | 3/1999 | Beier et al. ................... 707/101 |
| 5,892,905 A | | 4/1999 | Brandt et al. |
| 5,909,683 A | | 6/1999 | Miginiac et al. |
| 5,930,759 A | | 7/1999 | Moore et al. |
| 5,933,816 A | * | 8/1999 | Zeanah et al. .................. 705/35 |
| 5,937,189 A | | 8/1999 | Branson et al. |
| 5,940,809 A | | 8/1999 | Musmanno et al. |
| 5,950,169 A | | 9/1999 | Borghesi et al. |
| 5,950,192 A | * | 9/1999 | Moore et al. .................... 707/3 |
| 5,956,719 A | | 9/1999 | Kudo et al. |
| 5,987,434 A | | 11/1999 | Libman |
| 5,991,733 A | | 11/1999 | Aleia et al. |
| 5,991,756 A | | 11/1999 | Wu |
| 5,995,971 A | | 11/1999 | Douceur et al. |
| 6,003,033 A | | 12/1999 | Amano et al. |
| 6,006,193 A | * | 12/1999 | Gibson et al. .................... 705/8 |
| 6,023,694 A | | 2/2000 | Kouchi et al. |
| 6,038,393 A | | 3/2000 | Iyengar et al. |
| 6,049,665 A | | 4/2000 | Branson et al. |
| 6,064,983 A | | 5/2000 | Koehler |
| 6,075,851 A | * | 6/2000 | Pinard et al. ................. 379/199 |
| 6,081,832 A | | 6/2000 | Gilchrist et al. |
| 6,092,049 A | | 7/2000 | Chislenko et al. |
| 6,092,075 A | * | 7/2000 | Carey et al. .................. 707/102 |
| 6,105,007 A | | 8/2000 | Norris |
| 6,112,209 A | * | 8/2000 | Gusack ....................... 707/101 |
| 6,115,690 A | | 9/2000 | Wong |
| 6,134,582 A | | 10/2000 | Kennedy |
| 6,134,706 A | * | 10/2000 | Carey et al. .................. 717/102 |
| 6,163,770 A | | 12/2000 | Gamble et al. |
| 6,182,121 B1 | | 1/2001 | Wlaschin |
| 6,185,540 B1 | | 2/2001 | Schreitmueller et al. |
| 6,202,070 B1 | | 3/2001 | Nguyen et al. |
| 6,226,623 B1 | | 5/2001 | Schein et al. |
| 6,236,975 B1 | | 5/2001 | Boe et al. |
| 6,237,046 B1 | | 5/2001 | Ohmura et al. |
| 6,272,482 B1 | | 8/2001 | McKee et al. |
| 6,275,977 B1 | * | 8/2001 | Nagai et al. .................. 717/104 |
| 6,289,339 B1 | | 9/2001 | Weber |
| 6,289,355 B1 | | 9/2001 | Haderle et al. |
| 6,335,927 B1 | | 1/2002 | Elliott et al. |
| 6,336,096 B1 | | 1/2002 | Jernberg |
| 6,341,287 B1 | * | 1/2002 | Sziklai et al. ................ 707/102 |
| 6,385,612 B1 | | 5/2002 | Troisi |
| 6,393,386 B1 | | 5/2002 | Zager et al. |
| 6,424,951 B1 | * | 7/2002 | Shurling et al. ................ 705/14 |
| 6,438,563 B1 | | 8/2002 | Kawagoe |
| 6,442,533 B1 | | 8/2002 | Hinkle |
| 6,446,086 B1 | | 9/2002 | Bartlett et al. |
| 6,473,740 B2 | | 10/2002 | Cockrill et al. |
| 6,484,149 B1 | | 11/2002 | Jammes et al. |
| 6,557,752 B1 | | 5/2003 | Yacoob |
| 6,662,164 B1 | | 12/2003 | Koppelman et al. |
| 6,687,708 B1 | * | 2/2004 | Brobst et al. ............. 707/103 Y |
| 6,731,625 B1 | | 5/2004 | Eastep et al. |
| 6,754,181 B1 | | 6/2004 | Elliott et al. |
| 6,909,708 B1 | | 6/2005 | Krishnaswamy et al. |
| 6,925,468 B1 | | 8/2005 | Doughty et al. |
| 6,952,741 B1 | | 10/2005 | Bartlett et al. |
| 6,970,844 B1 | * | 11/2005 | Bierenbaum ................. 705/39 |
| 7,003,482 B1 | * | 2/2006 | Margoscin et al. ............ 705/35 |
| 7,130,924 B2 | | 10/2006 | Bartlett et al. |
| 7,353,196 B1 | | 4/2008 | Doughty et al. |
| 7,356,541 B1 | | 4/2008 | Doughty et al. |
| 7,363,264 B1 | | 4/2008 | Doughty |
| 7,526,487 B1 | | 4/2009 | Bobbitt et al. |
| 7,581,025 B2 | | 8/2009 | Bartlett et al. |
| 2003/0014421 A1 | * | 1/2003 | Jung .......................... 707/102 |

FOREIGN PATENT DOCUMENTS

| | | |
|---|---|---|
| EP | 0 465 018 | 1/1992 |
| EP | 0747839 | 12/1996 |
| EP | 0 836 779 | 4/1998 |
| EP | 0 926 608 | 6/1999 |
| WO | 9858356 | 12/1998 |

OTHER PUBLICATIONS

Blanning, R.W.;"An entity-relationship approach to model management"; Journal: Decision Support Systems, vol. 2, No. 1; 1986; p. 1.*

Kaindl, H.; "how to identify relations for domain models"; Siemens AG, Vienna, Austria; IEEE; Mar. 25-30, 1996; pp. 1 and 2.*

"@ Fault A Commitment to Consistency," Computer Sciences Corporation, Copyright 2000, pp. 1-2.

Merlin, Jr., William F., "Colossus: What We Know Today," The Merlin Law Group, Aug. 2000, Tampa, FL, pp. 1-8.

Merlin, Jr., William F., "Collision Course With The Colossus Program: How To Deal With It," The Merlin Law Group, May 2000, Tampa, FL, pp. 1-17.

Merlin, Jr., William F., "Overcoming Allstate's Trade Secrets and Work-Product Objections," The Merlin Law Group, Mar. 2000, Tampa, FL, pp. 1-31.

Mead, Jay, Technical Communication, Aug. 1998, V. 45, N.3, p. 353-380.

Scopus Introduces World's Most Complete Call Center Solution for Financial Services; PR Newswire dated Nov. 5, 1997.

Borland, Russel; "Running Microsoft Outlook 97", Microsoft Press, 1997.

Juhl, Randy P., "The OTC Revolution"; Drugtopics.com; Mar. 3, 1997, pp. 1-9.

Continuum Connections, vol. I, No. 1, The Continuum Company, Inc., Nov. 1991, 16 pages.

Continuum Connections, vol. I, No. 2, The Continuum Company, Inc., Jan./Feb. 1992, 17 pages.

Continuum Connections, vol. I, No. 3, The Continuum Company, Inc., Mar./Apr. 1992, 16 pages.

Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, the Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, Vol. III, No. 3, The Continuum Company, Inc., Mar./Apr. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, Vol. 4, No. 1, Computer Sciences Corporation, Jan. 1998, 64 pages.
Connections to the Americas, Vol. 4, No. 2, Computer Sciences Corporation, Feb./Mar. 1998, 50 pages.
Connections to the Americas, Vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
International search report application No. PCT/ US 00/18016, mailed Nov. 10, 2000.
International search report application No. PCT/US 00/18020 mailed Nov. 10, 2000.
International Preliminary Examination Report, PCT/US00/29978.
Wtitten Opinion, PCT/US00/29978 mailed Mar. 25, 2002.
Office Communication for Canadian Patent Application 2,391,680, mailed Feb. 1, 2008 (U1).
Office Communication for Canadian Patent Application 2,391,680, mailed Nov. 5, 2008 (U2).
U.S. Patent and Trademark Office, "Communication" for U.S. Appl. No. 09/345,698 mailed Nov. 26, 2003, available in PAIR.
U.S. Patent and Trademark Office, "Notice of Allowance" for U.S. Appl. No. 09/345,698 mailed Feb. 24, 2004, available in PAIR.
U.S. Patent and Trademark Office, "Notice of Allowance" for U.S. Appl. No. 09/345,698 mailed Nov. 17, 2004, available in PAIR.
U.S. Patent and Trademark Office, "Communication" for U.S. Appl. No. 11/243,461 mailed Feb. 28, 2006, available in PAIR.
U.S. Patent and Trademark Office, "Notice of Allowance" for U.S. Appl. No. 11/243,461 mailed Aug. 22, 2006, available in PAIR.
U.S. Patent and Trademark Office, "Communication" for U.S. Appl. No. 11/590,666 mailed Nov. 28, 2008, available in PAIR.
U.S. Patent and Trademark Office, "Notice of Allowance" for U.S. Appl. No. 11/590,666 mailed Apr. 15, 2009, available in PAIR.
U.S. Patent and Trademark Office, "Notice of Allowance" for U.S. Appl. No. 09/699,015 mailed Oct. 31, 2008, available in PAIR.

* cited by examiner

| SEQ | ELEM-ID CONSTANT | LEVEL | ELEM-ID | ABBREV | DESCRIPTION |
|---|---|---|---|---|---|
| 1 | ISSUER | 1 | D1000 | ISS | ISSUER SUBSYS ID |
| 2 | COMPANYA | 2 | D1001 | COA | COMPANY A |
| 3 | COMPANYB | 2 | D1011 | COB | COMPANY B |
| 4 | NONRISK | 3 | D1012 | NON | NON-RISK ACCOUNTS |
| 5 | BANK | 3 | D1021 | BNK | BANK |
| 6 | COMPANYC | 2 | D1031 | COC | COMPANY C |
| 7 | ACQUIRER | 1 | D2000 | ACQ | ACQUIRER SUBSYS ID |

FIG. 5

| SEQ | ELEM-ID CONSTANT | LEVEL | ELEM-ID | ABBREV | DESCRIPTION |
|---|---|---|---|---|---|
| 1 | ISSUER | 1 | D1000 | ISS | ISSUER SUBSYS ID |
| 2 | COMPANYA | 2 | D1001 | COA | COMPANY A |
| 3 | REGION | 3 | D1002 | RGN | REGIONAL OFFICE |
| 4 | BRANCH | 4 | D1003 | BRN | BRANCH OFFICE |
| 5 | COMPANYB | 2 | D1011 | COB | COMPANY B |
| 6 | NONRISK | 3 | D1012 | NON | NON-RISK ACCOUNTS |
| 7 | BANK | 4 | D1013 | BNK | NON-RISK BANK |
| 8 | BRANCH | 5 | D1014 | BRN | BANK BRANCH |
| 9 | BANK | 3 | D1021 | BNK | BANK |
| 10 | COMPANYC | 2 | D1031 | COC | COMPANY C |
| 11 | RETAIL | 3 | D1032 | RET | RETAIL STORE |
| 12 | RETAILCARD | 4 | D1033 | RTC | PRIVATE-LABEL CREDIT CARD |
| 13 | ACQUIRER | 1 | D2000 | ACQ | ACQUIRER SUBSYS ID |
| 14 | COMPANYA | 2 | D2001 | COA | COMPANY A |
| 15 | REGION | 3 | D2002 | RGN | REGIONAL OFFICE |
| 16 | BRANCH | 4 | D2003 | BRN | BRANCH OFFICE |
| 17 | COMPANYB | 2 | D2011 | COB | COMPANY B |
| 18 | BANK | 3 | D2012 | BNK | BANK |
| 19 | BRANCH | 4 | D2013 | BRN | BANK BRANCH |

FIG. 6

| 172 | 174 | 176 | 178 | 179 |
|---|---|---|---|---|
| ISS, | COA, | RGN, | BRN | NODE NUMBER |
| 10, | 1, | 10, | 100 | 4 |
| 10, | 1, | 10, | 200 | 5 |

| 182 | 184 | 186 | 188 | 189 |
|---|---|---|---|---|
| ACQ, | COB, | BNK, | BRN | NODE NUMBER |
| 20, | 2, | 70, | 700 | 20 |
| 20, | 2, | 70, | 800 | 21 |

CONFIGURING PROCESSING RELATIONSHIPS AMONG ENTITIES OF AN ORGANIZATION

PRIORITY CLAIM

This application claims the benefit of U.S. Provisional Application No. 60/162,412 entitled "Configuring Processing Relationships Among Entities Of An Organization," filed Oct. 29, 1999.

BACKGROUND OF THE INVENTION

1. Field of the Invention

The present invention generally relates to computer software programs, methods, systems and databases used in Financial Service Organizations. More particularly, the present invention relates to a system and method for configuring processing relationships among entities of a Financial Service Organization (FSO) for use in FSO transaction processing.

2. Description of the Related Art

FSOs such as banks, credit unions, insurance companies, mutual fund companies, credit card companies, brokerage houses, etc., use FSO computer systems to process business transactions. The FSO production systems, which are often referred to as FSO computer systems or FSO systems, are capable of executing application software programs. The application programs may enable FSOs to offer products and services to their clients. The FSO systems may include one or more databases for storing data. The databases may include, for example, groups of data such as the master files of customer account information, transaction-related data such as customer credit card purchase transactions, processing data such as the processing parameters used in processing transactions, and history data such as log files of daily activities for batch processing.

FSO systems often utilize hardcoded software to process FSO transactions. Changes in the business environment often result in corresponding changes to the processing relationship among various entities of a Financial Service Organization (FSO). For example, new banks being acquired or new branch locations being opened often add to the processing structure of an FSO. FSO systems which utilize hardcoded software may be more difficult to adapt to the changing processing structure.

The following is hereby incorporated by reference: Object Oriented mail server framework mechanism (U.S. Pat. No. 6,081,832), Object Oriented framework mechanism for order processing including predefined extensible classes for defining an order processing environment (U.S. Pat. No. 6,049,665), Object Oriented framework mechanism for determining configuration relations (U.S. Pat. No. 5,937,189), Object Oriented mail server framework mechanism (U.S. Pat. No. 5,768,505).

SUMMARY OF THE INVENTION

An improved method, system and carrier medium may be used to configure a Financial Service Organization (FSO) production system. Such a production system typically gathers business data (including transactional data), stores the data, sorts the data, and collates the data into FSO reports used, for example, by various entities of the FSO.

In one embodiment, a multilevel business structure, which may represent the processing relationship between various entities of the FSO, may be configured. A processing relationship configuration program may be used to configure, and subsequently modify, a processing relationship structure. A multilevel node structure may be defined to correspond to the processing relationship structure within an FSO. In one embodiment, one or more rows and one or more columns may represent the multilevel node structure. In one embodiment, a node may be created and uniquely defined to represent an FSO physical entity and/or an FSO function. In one embodiment, examples of an FSO physical entity may be a bank, a branch office, a department, etc. An FSO function, in one embodiment, may be an issuance of a credit card, for example.

In one embodiment, the user may construct a processing relationship structure by selecting a required processing relationship object from one or more objects represented on a display screen. The user may specify the values associated with the selected processing relationship object which may include level number, object name, object identifier, etc. More than one processing relationship object of the same type may be created e.g., multiple bank objects may be created as instances of a bank object. In one embodiment, a root level structure may include only one node. Nodes beneath a node may be referred to as descendents of the node. A node number may uniquely identify a node object in the processing relationship structure. Each newly created node in the functional relationship structure may be assigned a node identifier. In one embodiment, a user may assign a node identifier and the processing relationship configuration program may assign a node number. In one embodiment, the node identifier may be unique. By defining each of the nodes at each of the levels of the processing relationship structure the user may complete the configuration process. In one embodiment, an FSO database may be used to store the processing relationship structure information.

In one embodiment, any node and its relationship with other nodes may be edited to reflect current business conditions by using the edit processing function included in the processing relationship configuration program. In one embodiment, editing may include node operations such as insert, delete, change or expand. In one embodiment, FSO software, such as a program to generate reports, may use the processing relationship structure information to reflect current business conditions.

BRIEF DESCRIPTION OF THE DRAWINGS

FIG. 5 illustrates one embodiment of an interactive computer display screen for configuring processing relationships, with a first, second, and third level of objects displayed;

FIG. 6 illustrates one embodiment of an interactive computer display screen for configuring processing relationships, with five levels of objects displayed;

FIG. 7 illustrates one embodiment of an interactive computer display screen for creating instances of a first object in a processing relationships structure;

FIG. 8 illustrates one embodiment of an interactive computer display screen for creating instances of a second object in a processing relationships structure;

Figure 1A:
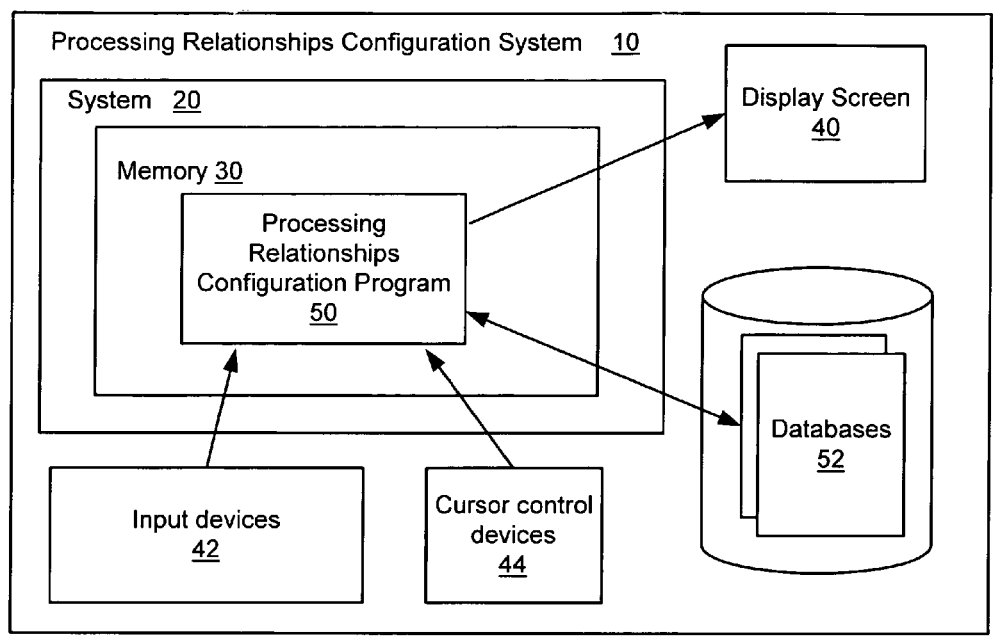
FIG. 1a is a block diagram illustrating one embodiment of an FSO computer system for configuring processing relationships.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may include other types of memory or combinations thereof. In addition, the memory medium may be located in a first computer in which the programs are executed, or may be located in a second computer that connects to the first computer (e.g., over a network). In the latter instance, the second computer may provide the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for configuring the FSO system software programs and databases in an FSO system, and for processing FSO transactions in the FSO system, as described herein. The software program(s) may be implemented in any of various ways, including procedure-based techniques, component-based techniques, and/or object-oriented techniques, among others. For example, the software program(s) may be implemented using ActiveX controls, C, C++ objects, JavaBeans, Microsoft Foundation Classes (MFC), or other technologies or methodologies, as desired. A CPU, such as the host CPU, executing code and data from the memory medium includes a way to create and execute the software program or programs according to the methods, flowcharts, and/or block diagrams described below.

A computer system's software generally includes at least one operating system, which is typically a specialized software program that manages and provides services to other software programs on the computer system. Examples of operating systems may include, but are not limited to: Windows NT available from Microsoft Corporation, and the MVS and OS/390 operating systems available from IBM. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

The following sixteen paragraphs introduce various terminologies, definitions, abbreviations, etc., as used herein to describe various embodiments.

As used herein, a Financial Service Organization (FSO) is a business organization that provides financial services to customers and client organizations. As used herein, the term customer generally refers to an individual, and client organization generally refers to other businesses, including retail businesses and other FSOs. Services provided to customers and client organizations include credit products, such as loans and credit cards. An FSO may also provide services to client organizations such as credit card transaction processing. Examples of FSOs include, but are not limited to, banks, credit unions, insurance companies, mutual fund companies, credit card companies and brokerage houses. An FSO that issues credit cards and processes credit card transactions may be referred to as a credit card institution. An FSO may include one or more organizational units. Examples of organizational units include, but are not limited to, main offices, divisions, regional offices, and branch offices.

As used herein, an FSO transaction may be defined as an occurrence of a service provided to a customer or client organization. Examples of FSO transactions include, but are not limited to, financial transactions such as deposits, withdrawals, loan application servicing, and credit card application servicing. FSO transactions may also include services related to financial products such as loans and credit cards previously issued to FSO customers and client organizations. These services may include processing of credit card purchases and collection of payments.

An FSO system may include a data dictionary. A data dictionary may be defined as a collection of descriptions of data items in the database. A description of a data item in a database may be called a data element. A data item may be referred to as a data element value. A data element in the data dictionary may describe attributes of a data element value in the database. Examples of attributes of data element values include, but are not limited to: location in the database, size, and data type. For example, an FSO system data dictionary may describe the data elements involved in credit card processing. The data dictionary may describe each of the data elements in the database for credit card processing. A collection of data may include data elements defined in the data dictionary. Examples of a collection of data, may include, but not be limited to, customer account master files and daily transaction-related data. Examples of data elements in an FSO data dictionary include, but are not limited to: customer name, credit card type, and card issuer.

As used herein, a key is one or more data elements in a database record or group of records that may be used to identify the record or group of records. For example, a record for storing information about an individual may have a name data element. The name data element may be used as a key to identify a particular individual's record in the database. A key value is an instance of a key in the database. In the example above, an example of a key value for a name data element used as a key might be "John Smith." In some examples, not all data elements in a database may be available for use in keys. Data elements that are available for use in keys may be referred to as key elements.

The format of a key may be stored in a key definition. A key definition may include one or more key elements that in combination make the key. During configuration of an FSO system, key definitions may be used in creating key values for records or groups of records in the database. During processing, key definitions may be used by the FSO system to create key values and to read key values stored in the database. During the processing of a transaction, the FSO system may create a key value from transaction-related data using a key definition to extract data element values from the transaction-related data, and may compare the key value to key values stored in the database while searching for a matching key value. A key value created during processing from a key definition and transaction-related data may be referred to as a processing key value.

As used herein, the term "break key" has a different meaning than the term "key" described above. A break key may be defined as a field in a record that may be used as a sort field and/or as a collating field for the record. For example, a set of records may have a field A designated as a break key. Each record's break key field may be set to a break key value. When the records are sorted by a sort process, the sort process may sort the records on the break key field. The sort may be done in ascending or descending order. A break key field may be used in collating the records after a sort. For example, a first group of records with a first break key value may be written to a first file, and a second group of records with a second break key value may be written to a second file.

The FSO system database may include processing parameters used in processing transactions. Processing parameters may be used to apply business logic to the transactions during processing. An example of a transaction processed in an FSO system is a credit card purchase transaction. An example of a processing parameter is a credit card purchase transaction price that may be charged to a client of a credit card institution for the processing of a credit card purchase transaction. An instance of a processing parameter in the database may be referred to as a processing parameter value. For example, an instance of a credit card purchase transaction price might be "$1.50." In some cases, a processing parameter value may include more than one data value. For example, a matrix of data values used in transformation functions on tables of data may be stored as a processing parameter value.

An FSO transaction processing software program may use one or more processing parameters during the processing of a transaction. A processing parameter may have a different processing parameter value for different transactions. The software program may examine the values of one or more data elements in the transaction data and master files to determine the processing parameter value for the transaction. A combination of data elements used to determine the processing parameter value may be referred to as the key definition for the processing parameter. The combination of data element values constructed from the key definition may be referred to as a key value. For example, a software program for processing credit card transactions for a credit card institution may use the credit card issuer and card type to determine what transaction price to charge a client of the credit card institution for processing a credit card transaction. The key definition in this example includes the credit card issuer data element and card type data element, and the key value is constructed from the values for the credit card issuer data element and card type data element read from the credit card transaction data or from a master file associated with the transaction.

In one embodiment, processing parameter values and the key values used to identify the processing parameter values may be stored in tables in the database. The tables in the database that store the processing parameter values and key values may be referred to as Process Control Data (PCD) tables or processing parameter tables. In one embodiment, there may be one PCD table for each processing parameter in the FSO system.

Processing parameters are one example of parameters that may be stored in PCD tables and located using key definitions as described herein. Examples of other types of parameters that may be stored in PCD tables are default parameters and definition parameters. Default parameters may be used to fill in default information in records in the database when they are created. For example, when a new customer account is created, one or more fields in the customer account master file may be filled with default parameter values. Default parameter values may be retrieved from PCD tables using key values constructed from the PCD key definitions and data element values from the customer account master file. Definition parameters are text or numeric values that are located using key values as codes. An example is a text error message that may be looked up using a numeric error code as a key value.

During processing, an FSO transaction may be stored as a record or file in the FSO system. In one embodiment, the FSO transaction may be stored in the FSO system database. A portion of the FSO transaction record may be read into system memory during processing. An FSO transaction record may include one or more data elements. The data elements included in an FSO transaction record may be defined in the data dictionary. The data elements in the transaction record may describe the various attributes of the transaction. For example, the data elements in a credit card transaction record may include items such as the customer's name, account numbers, credit card type, card issuer, date of the transaction, and the business at which the transaction originated.

An example of an FSO that may use an FSO computer system as described herein is a credit card institution. A credit card institution may issue credit cards to customers and client institutions of the FSO. The credit card institution may also issue credit cards on behalf of client businesses such as department stores. The credit card institution may also acquire and process credit card transactions from customers and client businesses such as department stores. For example, a credit card institution may issue its own credit card. Continuing the example, the credit card institution may also have client department stores. The credit card institution may issue a credit card under a department store's name, and may collect and process all credit card transactions for the department store. The credit card institution may charge a fee for each transaction processed. Some of the credit card transactions collected by the credit card institution may be transactions for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

In the above example, the fee charged for each transaction, also called the merchant transaction price, is an example of a processing parameter for an FSO system in a credit card institution. One embodiment of an FSO system database in a credit card institution may include a merchant transaction pricing PCD table. The merchant transaction pricing PCD table may include one or more merchant transaction pricing values. Each merchant transaction pricing value may be associated with one unique key value in the table. The key values in the PCD table may be constructed using a key definition. Each processing parameter in the FSO system, and thus each PCD table, may be associated with a key definition. In one embodiment, the FSO system database may include a key definition table for storing key definitions in the FSO system.

A key definition may include one or more data elements from the data dictionary. As an example, the merchant transaction pricing parameter described above may have a key definition that includes one or more data elements. Examples of data elements that may be included as fields in the merchant transaction pricing parameter key definition include card issuer, card type, on us/not on us, and transaction type. A card issuer may be the brand of card, for example, VISA, MasterCard, Discovery, etc. Examples of card types may include, but are not limited to: "gold" and "platinum" cards issued by some card issuers. On us/not on us refers to whether the FSO processing the transaction also issued the credit card. "On us" may mean that the FSO did issue the card. "Not on us" may mean that another FSO issued the card, and thus the transaction may be forwarded to the other FSO for processing. The term "transaction type" may refer to the way the transaction was entered; examples of transaction types may include, but are not limited to: manual, electronic, and telephone transactions. A manual credit card transaction may be a credit card transaction that is entered by hand and imprinted with a credit card imprint machine. An electronic transaction may be a credit card transaction where the magnetic strip on a credit card is read electronically. A telephone transaction may be a credit card transaction performed by telephone call.

The organizational and/or functional structure of an FSO may be represented in a FSO computer system by a processing relationship structure. A processing relationship structure may be defined as a computer representation of the entities in the FSO and of the relationships among the entities, wherein the computer representation is useable by software applications to process FSO business data based upon the organizational and/or functional structure of the organization. In one embodiment, the processing relationship structure may be stored in a database on the FSO computer system. In one embodiment, the processing relationship structure may be configured by a user of the FSO system at configuration of the FSO system or during FSO system runtime. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system.

The data dictionary may include one or more processing relationship data elements. One or more processing relationship data elements may be included as key fields in a key definition. In one embodiment, a processing relationship data element may be a Processing Relationship Node Number data element, and the Processing Relationship Node Number data element may be included in a key definition. Thus, a processing parameter value may be located in a PCD table using processing relationship data elements such as the Processing Relationship Node Number data element. This allows processing parameter values to be located for transactions based upon the ownership of the account for which the transaction was generated.

FIG. 1a—A Block Diagram Illustrating One Embodiment of an FSO Computer System for Configuring Processing Relationships In FIG. 1a, an embodiment of an FSO business transaction processing system 10 may include a computer system 20, a display screen 40 connected to the computer system, and one or more databases 52 residing on external storage. Computer system 20 may include memory 30 configured to store computer programs for execution on computer system 20, and a central processing unit (not shown) configured to execute instructions of computer programs residing on computer system 20. Processing relationships configuration program 50 may be stored in memory 20. System 10 may also include a business transaction processing program (not shown). In one embodiment, processing relationships configuration program 50 may be integrated in the business transaction processing program, so that configuring processing relationships may be viewed as a function within the business transaction processing program. System 10 may also include one or more input devices 42 such as a keyboard for entering data and commands into program 50 and one or more cursor control devices 44 such as a mouse.

Figure 1B:
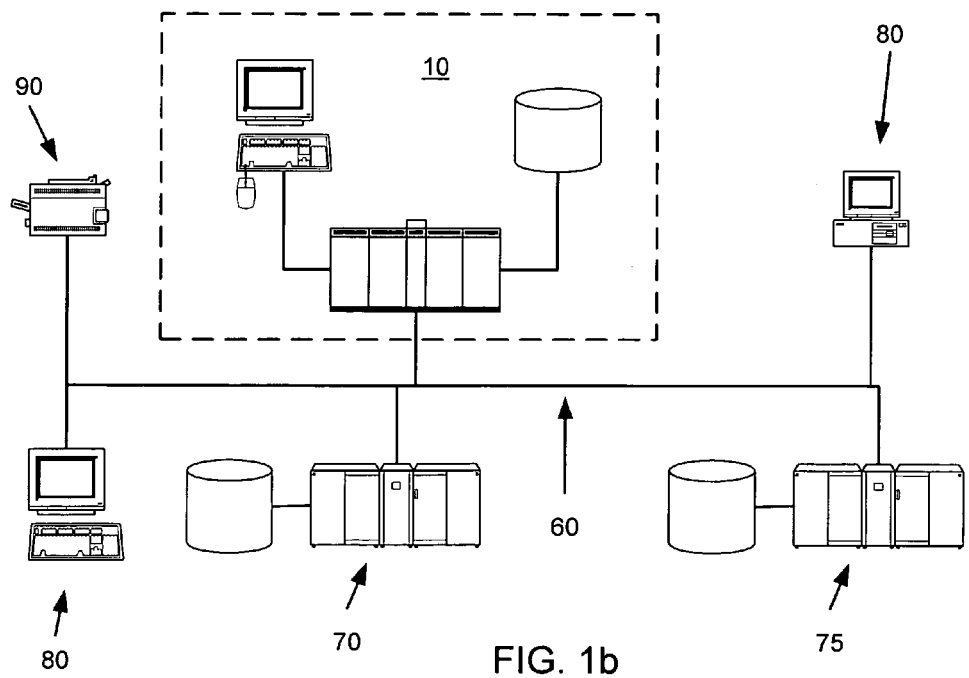
FIG. 1b illustrates one embodiment of an FSO computer system integrated into a networked system for processing FSO business data.

FIG. 1b—One Embodiment of an FSO Computer System Integrated into a Networked System for Processing FSO Business Data FIG. 1b illustrates one embodiment of a networked system configured for processing FSO business data. Network 60 may be a local area network or wide area network, and may include communications links including, but not limited to, Ethernet, token ring, internet, satellite and modem. An FSO computer system 10 as illustrated in FIG. 1a may be connected to network 60. One or more user workstations 80 may be connected to network 60 and may be used by users of the FSO computer system to enter and modify data, initiate data processing tasks, and monitor the processing of data in the FSO computer system. One or more printers 90 for outputting hardcopy reports on FSO system data may also be connected to network 60. One or more other FSO computer systems 70 may also be connected to network 60. In one embodiment, one or more computer systems 75 of client businesses of the FSO may also be connected to network 60. Client businesses of the FSO may forward business transactions to the FSO computer system for processing. In one embodiment, computer systems 75 may include computer systems belonging to one or more entities within the FSO, such as branches, regional offices, banks, departments, etc.

Various embodiments of configuring a processing relationship structure that may be modeled after an FSO business organization structure A Financial Service Organization (FSO) is a business organization that provides financial products and/or services to customers and/or client organizations. An FSO may include one or more organizational units. Examples of organizational units include, but are not limited to, an entity, a business unit, a subsidiary, a division, a functional unit, a headquarters, an operating unit, a profit center, a regional office, and a branch office.

In one example of an FSO business organization according to one embodiment, the FSO business organization may be a global bank 2250. The FSO business units may be represented in a chart or a similar graphical form to illustrate the attributes of an FSO organization such as, but not limited to, the reporting relationship between various FSO entities, the reporting structure, the number of hierarchical levels between the highest level entity and the lowest level entity, and the number of direct reports for an FSO entity. Each FSO entity may be represented as a node or a block on an FSO organizational chart. For example, global bank may be represented as node 2250, the business unit for Americas by node 2252, the business unit for Europe, Middle East and Africa by node 2254. Each node may have a parent node and one or more children nodes. For example, USA business unit 2256 may have a parent node Americas 2252 and may have two children nodes, region AUE 2260 and region AUW 2258. Each node may be identified uniquely with a node number and/or a name. The FSO organizational chart may include multiple levels 2266 in the hierarchical relationship. A node without a parent may be described as a root node or a level zero node. A root node may include the entire FSO organization. The global bank node 2250 may be described as a root node. The FSO organizational chart may be updated, in real-time, as new FSO entities are introduced or removed by adding or deleting a node corresponding to the FSO entity. The FSO organizational chart may thus graphically represent the current, real-world state of the FSO organization.

In one embodiment, an FSO user may create a similar or identical processing relationship structure modeled after the FSO business organization. In one embodiment, an FSO user may use a processing relationship configuration software program to configure or define the processing relationships between various FSO entities which represent the FSO business organization. In one embodiment, an FSO user may configure a node in the processing relationship structure to provide the same or similar functionality provided by the real-world FSO entity. In one embodiment, there may be a one-to-one correspondence between a node included in the FSO business organization chart and a node included in the processing relationship structure.

In one embodiment, the processing relationship structure 2276 may be based on object-oriented technology. Each node in the processing relationship structure 2276 may be represented by a software object which may be defined by the methods and properties associated with the object. For example, in one embodiment, a node may be represented by a bank object. The bank object may include properties such as, but not limited to, bank locations, ATM locations, types of customer accounts, types of loans. The bank object may include methods such as, but not limited to, add_new_account, add_new_location, delete_current_loan. In one embodiment, an FSO user may create various classes of objects such as a class of bank objects. A user may create an instance of the class to create, for example, a new global bank. The new global bank object may inherit all of the properties and methods associated with the class of bank objects.

In one embodiment, the processing relationship structure 2276 may be represented graphically on a display screen. A user of an FSO may modify or edit the processing relationship structure 2276 by adding or deleting a node, e.g. the object associated with the node. In one embodiment, the node or object may be represented on a display screen as an icon or a symbol. In one embodiment, a group of objects, each represented as an icon, may be displayed as palette of objects 2274 on a display screen. In one embodiment, the user may use drag-and-drop techniques to add a new object selectable from a palette of objects 2274 to the processing relationship structure. For example, the FSO user may position a cursor 2268 on a node object 2274 and use a drag-and-drop method 2272 to place the selected object 2274 on the processing relationship structure. The FSO user may then configure the node, e.g., the object, by using and/or defining the properties and methods associated with that node.

Figure 3:
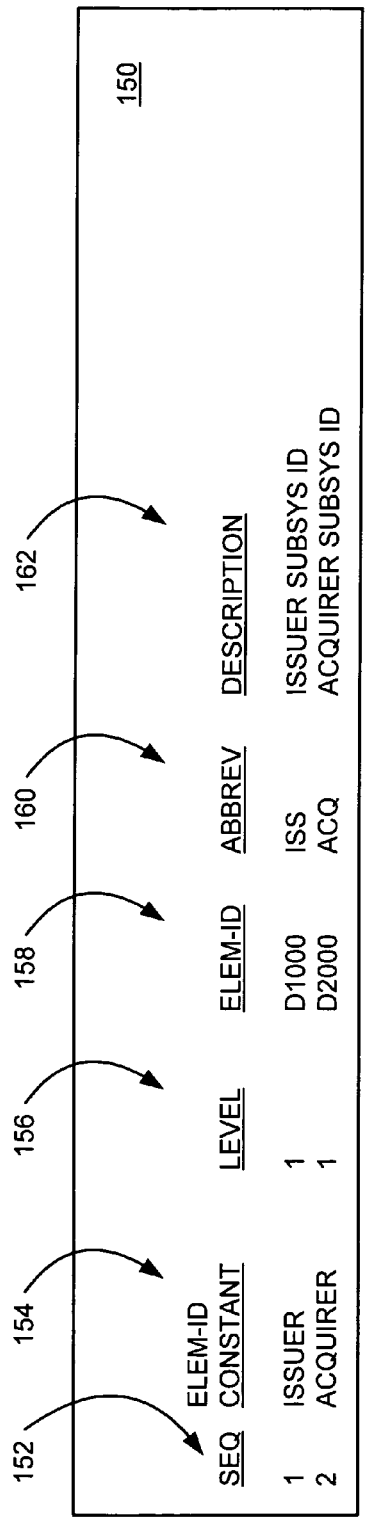
FIG. 3 illustrates one embodiment of an interactive computer display screen for configuring processing relationships, with a first level of objects representing entities in the FSO displayed.

In one embodiment, the processing relationship structure may be based on traditional programming and traditional database technology. Programming in the C language may be an example of traditional programming. Examples of traditional database technologies may include, but not be limited to, hierarchical, proprietary, relational, flat file. Each node in the processing relationship structure may be represented, in one embodiment, by a table in a relational database. A node may be defined by the rows and columns associated with the table. For example, in one embodiment, a bank table may represent a node. The bank table may include attributes such as, but not limited to, a node identifier, a level number, a sequence number, a bank location identifier, an ATM location description, a customer account number, a type of loan. Access to the bank table may include identifying required keys such as, but not limited to, a transaction identifier, an account number, an FSO user identifier. In one embodiment, the processing relationship structure may be represented by text on a display screen 150, as illustrated in FIG. 3. The parent/child or a precedent/descendent relationship may be defined in one embodiment by defining a previous node identifier and a next node identifier. An FSO user may modify or edit the processing relationship structure by adding or deleting a row in a table associated with the node being edited. The columns 152-162 are further described with reference to FIG. 3. The FSO user may add the root level node 2250. In one embodiment, the FSO user may add a first row to a global bank table. The user may configure the processing relationship structure by entering values for attributes such as, but not limited to, a node identifier, a level number, a sequence number. The FSO user may insert a row to add node 2252 for Americas. The user may configure the new node by entering values for attributes such as, but not limited to, a node identifier, a level number, a sequence number. The FSO user may insert a row to add node 2254 for Europe, Middle East and Africa. The process may be repeated for all of the remaining nodes included in the global bank business organization chart. The FSO user may perform a modification to the processing relationship structure, e.g., may reconfigure based on changes in the real world.

In one embodiment, an expert system may perform all the functions of an FSO user. An expert system may be programmed to duplicate or re-create all of the functions performed by the FSO user. For example, an expert system may graphically configure and/or modify the processing relationship structure.

In one embodiment, it may be possible to make the processing relationship structure substantially identical to the FSO business organization. By using the same objects and/or tables, the FSO user may eliminate the need to map real-life FSO entities with corresponding objects which replicate the properties and/methods associated with the real-life FSO entities. Thus, the FSO user may automatically create and/or update a processing relationship structure when the user creates and/or modifies the FSO business organization structure. In one embodiment, the user may be able to create separate processing relationship objects from the FSO entity objects such that the processing relationship objects may be able to automatically mirror or track their corresponding master FSO objects.

The processing relationship structure may be used by FSO application software programs to process FSO transactions. Examples of application software which may utilize the processing relationship structure, may include, but are not limited to, a report generation program, a credit card transaction processing program, a billing program, a monthly account reconciliation summary program. In one embodiment, changes made to the node associated objects and/or tables may have little or no effect on the application software program source code. For example, the global bank may reorganize its visa account business unit 2262 such that the visa unit now falls under region AUW instead of region AUE. This change may have little or no impact on the report generation program source code for the visa account business unit 2262 since all the objects and/or tables associated with the visa account node, i.e., the owner of the data, may be automatically updated when the FSO user makes changes to the processing relationship structure. The application programs may reference the current properties and/or attributes of the node objects and/or tables to process FSO transactions.

Figure 2:
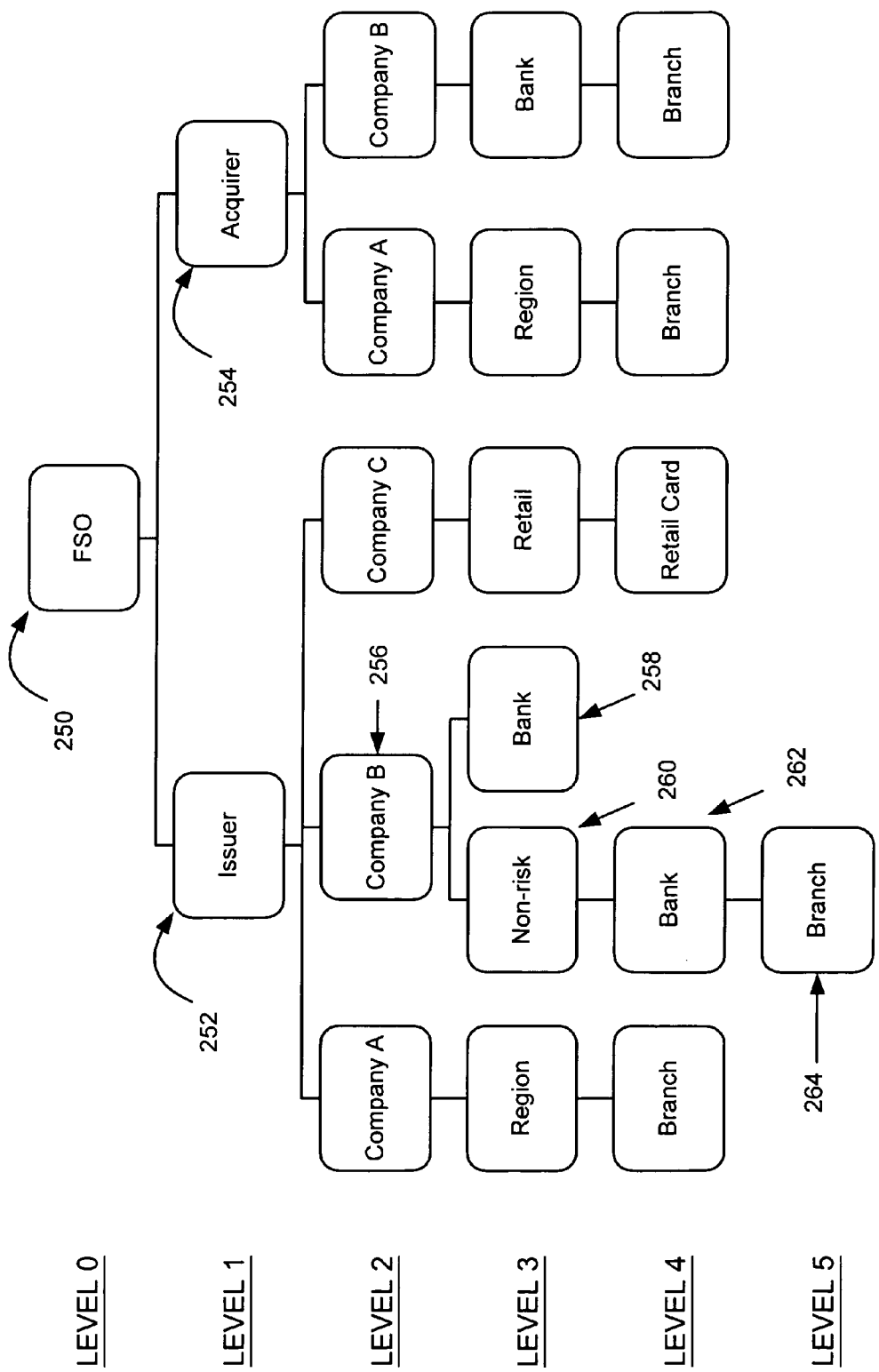
FIG. 2 is an example of one embodiment of a multilevel business processing relationship to be modeled in an FSO business system.
Figure 9:
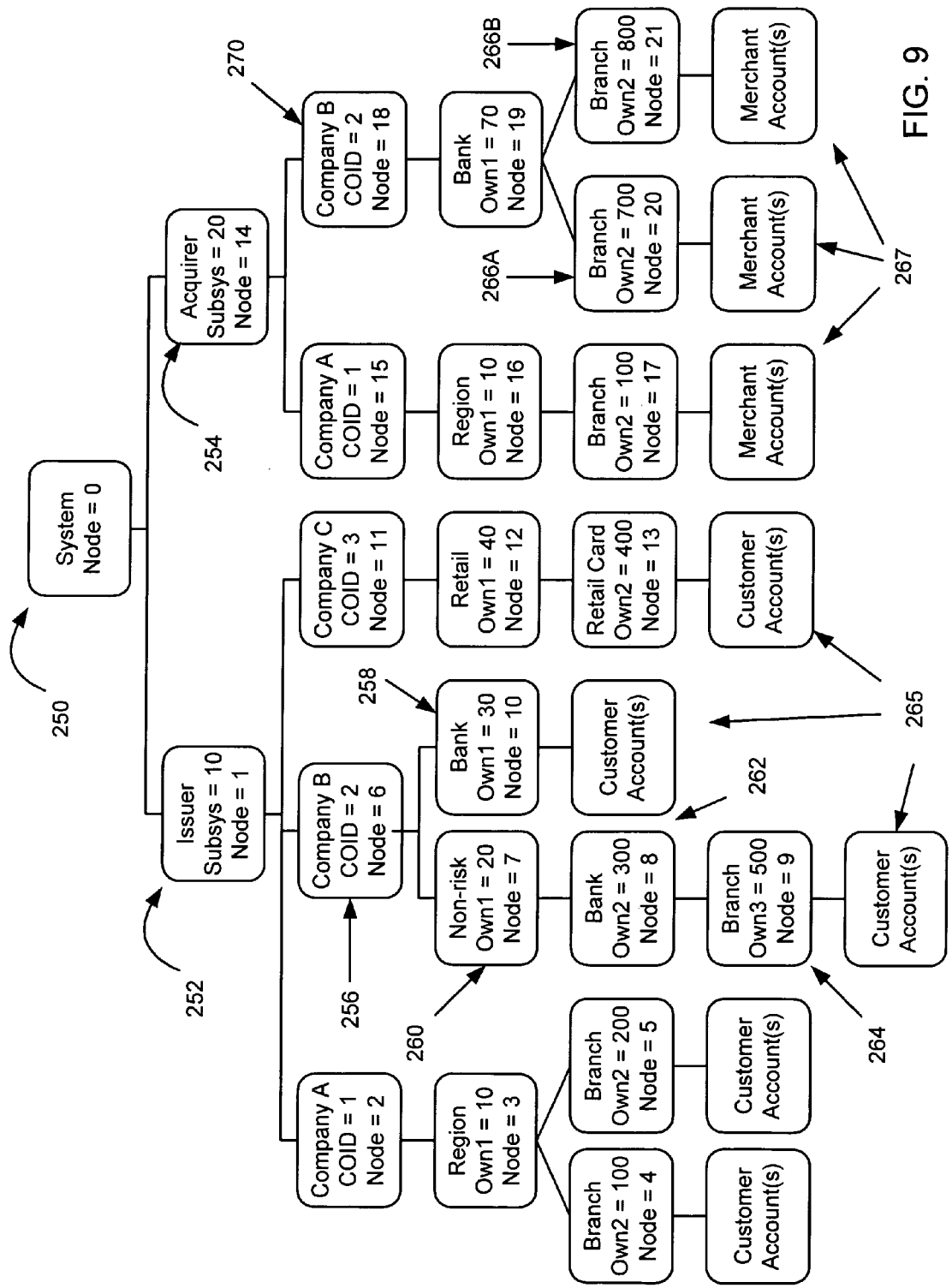
FIG. 9 is an example of one embodiment of a computer model of the a multilevel business processing relationship illustrated in FIG. 2, wherein values have been assigned to the objects in the processing relationship.

FIG. 2 through FIG. 9 further illustrate various embodiments of configuring a processing relationship structure by starting with a representative FSO organization structure in FIG. 2 and ending with a corresponding processing relationship structure in FIG. 9. FIGS. 10*a*-10*d* include various flow charts illustrating one embodiment of a method of configuring processing relationships for use in an FSO application software program, such as a report program.

FIG. 2—An Example of One Embodiment of a Multilevel Business Processing Relationship to be Modeled in an FSO Business System FIG. 2 graphically illustrates one example of a multilevel business processing relationship that may be modeled in an FSO business system using a processing relationships configuration program according to one embodiment. An FSO user or any other person or persons familiar with the FSO organization may create a graphical diagram similar to FIG. 2 to reflect the FSO business organization.

In this example, six levels are shown (levels 0-5). Level 0 may be called the root level of the processing relationship structure. Only one node appears at level 0. Node 250 at level 0 represents the root level of the FSO processing relationship structure. All other nodes in the structure are beneath node 250. Nodes beneath a node may be called descendents of the node. At level 1, one or more nodes may appear. In this example, an issuer node 252 and an acquirer node 254 are shown.

In the processing relationship structure, some nodes may represent physical entities in the FSO, and others may represent functional areas. A physical entity is an organizational unit that has a physical presence or manifestation, such as a bank branch office, regional office, or credit card line. A node representing a functional area is used to organize one or more other nodes into a sub-processing relationship group in the FSO processing relationship based upon some function of the FSO. Examples of functional areas include issuer, acquirer, and non-risk. The issuer function may be described as the function of issuing credit cards or other credit instruments to customers of the FSO. The acquirer function may be described as the function of acquiring payments from users of credit cards and other credit instruments on behalf of the FSO and client organizations of the FSO. Non-risk is a functional area that may be used to group nodes dealing with non-risk (or very low risk) instruments such as some types of bonds and secured loans.

Three nodes are shown as descendents of issuer node 252 at level 2. One of the three nodes is Company B 256. Note that Company B is also represented by a node underneath acquirer node 254. In a processing relationship, an entity may appear below more than one functional area. An entity may have more than one function, and the functions of an entity may be represented by separate nodes in the processing relationship.

Company B node 256 has two descendents at level 3, Non-risk node 260 and Bank node 258. A node in the processing relationship tree may represent an object in the processing relationship, such as a bank. During the configuration, a node may be given multiple instances of the object. For example, bank node 258 may represent banks in general at level 3 under Company B. When configured, multiple banks may be created as instances of bank node 258. For example, First Street Bank, Main Street Bank, and Elm Street Bank may be added to the processing relationship structure as instances of Bank node 258. In this example, the three banks report to Company B, but not to each other. Non-risk node 260 has one descendent at level 4, Bank 262. Bank 262 has one descendent at level 5, Branch 264.

By using a processing relationships configuration program and its associated display screens, as described in FIGS. 3-9, the FSO user may configure the processing relationship structure. At the end of the configuration process, FIG. 9 may describe a processing relationship structure, which may be equivalent to the multilevel business processing relationship illustrated in FIG. 2.

FIGS. 3-8—Various Embodiments of Configuring a Processing Relationship Structure Using Various Interactive Computer Display Screens Generated by a Processing Relationship Configuration Program FIGS. 3-8 describe various embodiments of configuring the processing relationship structure, described in FIG. 2*f*, using various interactive computer display screens generated by a processing relationship configuration program.

FIG. 3—One Embodiment of an Interactive Computer Display Screen for Configuring Processing Relationships, with a First Level of Objects Representing Entities in the FSO Displayed FIG. 3 illustrates one embodiment of a screen 150 for the user configuration of processing relationships using a processing relationship configuration program in an FSO system. In one embodiment, screen 150 may be presented to a user of a processing relationship configuration program in response to the user selecting an "edit processing relationship" or "create processing relationship" function choice. Function choices may be selectable in a variety of methods, including standard GUI methods such as buttons, menus, text boxes, and mouse highlighting and selection. In one embodiment, the screen 150 may be a graphical user interface (GUI). In another embodiment, the screen 150 may be a textual interface. Screen 150 may include one or more function choices (not shown). For example, screen 150 may include insert node, delete node, edit node, and expand node function choices. Screen 150 may include multiple rows, with each row displaying one node in the processing relationships structure, and multiple columns, with each column displaying one property of the nodes displayed in the rows. The data in the rows and columns may be modifiable by a user of the system. New rows may be inserted in screen 150 by selecting an insertion point and selecting an "insert" function choice from screen 150. In this example, two rows have been inserted. The user may then insert data in one or more of the columns to configure the node. Some of the columns may be automatically filled in by the processing relationship configuration program upon creating the new node.

Columns in screen 150 may include a sequence column 152, an element ID constant column 154, a level column 156, an element ID column 158, an abbreviation column 160, and a description column 162. Sequence column 152 may display a sequence number for the rows in screen 150. In one embodiment, the Element ID constant column 154 may identify an attribute of a node that participates in the processing relationship structure. Element ID constant column 154 may be used to enter, display, and edit a textual identifier for the node. Level column 156 may be used to display the level of a node in the processing relationship structure. For example, FIG. 2*f* illustrates level 0 through level 5. Element ID column 158 may be used to enter, display, and edit an alphanumeric database identifier for the node. Abbreviation column 160 may be used to enter, display, and edit a short label for the node. Description column 162 may be used to enter, display, and edit a textual description of the node.

In one embodiment, an FSO user may create a new object by using the drag-and-drop method. Screen 150 may be displayed in response to an FSO user further identifying the values associated with the methods and properties of the newly created object. In one embodiment, the FSO user may identify specific values for a sequence column 152, an element ID constant column 154, a level column 156, an element ID column 158, an abbreviation column 160, and a description column 162 associated with the newly created object.

Figure 4:
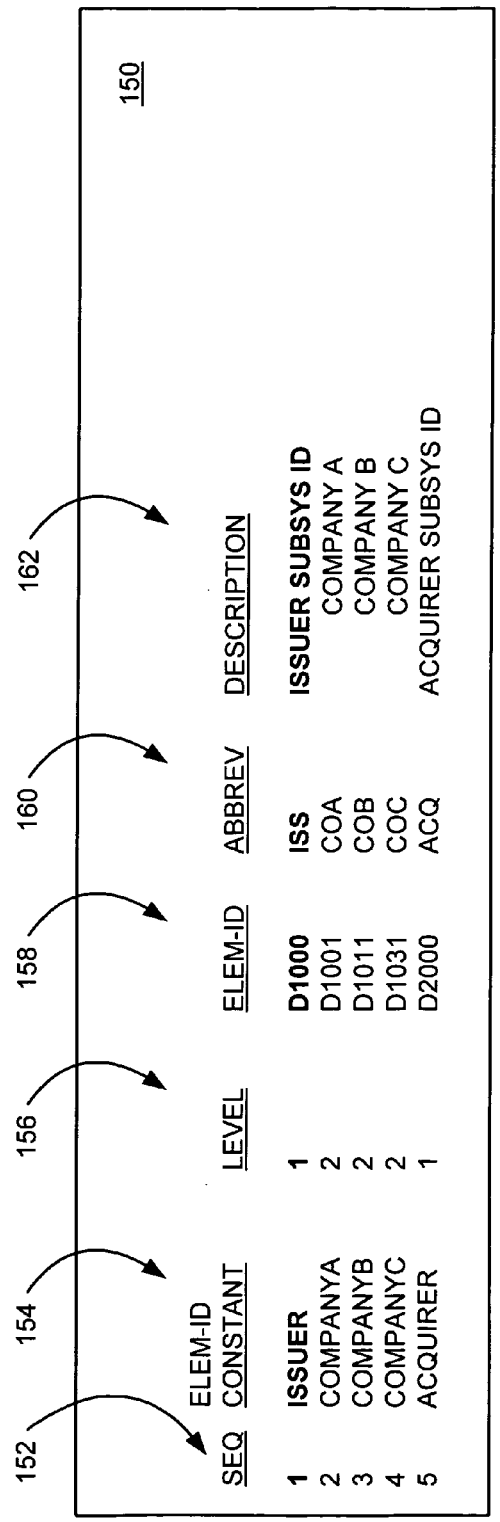
FIG. 4 illustrates one embodiment of an interactive computer display screen for configuring processing relationships, with a first and second level of objects displayed.

FIG. 4—One Embodiment of an Interactive Computer Display Screen for Configuring Processing Relationships, with a First and Second Level of Objects Displayed FIG. 4 illustrates one embodiment of a screen 150 for the user configuration of processing relationships using a processing relationship configuration program in an FSO system. This example shows screen 150 from FIG. 3 with more rows added. The first row, or node, at level one in the processing relationship structure, is shown highlighted, signifying that it is selected, with three rows, or nodes, added at level two below the selected first node. The new rows were inserted in screen 150 by selecting the first row as the insertion point and selecting an insert function choice from screen 150. The columns in the new rows were then filled in. Some of the columns may be filled in by the user adding the rows, and some may be automatically filled by the processing relationship configuration program. In this example, the sequence column 152 and the level column 156 may be automatically calculated and displayed by the processing relationship configuration program when a new row, or node, is added. The other columns (154, 158, 160, and 162) may be filled in by the user.

FIG. 5—One Embodiment of an Interactive Computer Display Screen for Configuring Processing Relationships, with a First, Second, and Third Level of Objects Displayed FIG. 5 illustrates one embodiment of a screen 150 for the user configuration of processing relationships using a processing relationship configuration program in an FSO system. This example shows screen 150 from FIG. 4 with more rows added. The third row, or node, at level two in the processing relationship structure, is shown highlighted, signifying that it is selected, with two rows, or nodes, added at level three below the selected first node. The user may continue selecting rows and inserting rows and filling in the columns in the newly added rows until a processing relationship structure, such as that illustrated in FIG. 2, has been fully defined.

FIG. 6—One Embodiment of an Interactive Computer Display Screen for Configuring Processing Relationships, with Five Levels of Objects Displayed FIG. 6 illustrates one embodiment of a screen 150 for the user configuration of processing relationships using a processing relationship configuration program in an FSO system. This example shows a processing relationship structure, such as that illustrated in FIG. 2*f*, which has been fully defined. The descendents of a first node in the processing relationship structure may appear directly beneath the node; after the descendents of the first node, a second node on the same level may appear, and then the second node's dependents, and so on. One or more columns may be indented to represent the processing relationship structure's levels. In this example, the description fields are indented to represent the levels.

FIG. 7—One Embodiment of an Interactive Computer Display Screen for Creating Instances of a First Object in a Processing Relationships Structure FIG. 7 illustrates one embodiment of a screen 170 for the user configuration of instances of nodes, or processing relationship objects, using a processing relationship configuration program in an FSO system. Screen 170 may be invoked by selecting one of the rows in screen 150 shown in FIG. 6 and selecting an "expand node" function choice from screen 150. Screen 170 may include one or more function choices (not shown). For example, screen 170 may include insert row, delete row, and edit row function choices. Function choices may be selectable in a variety of methods, including standard GUI methods such as buttons, menus, text boxes, and mouse highlighting and selection. Screen 170 may include one or more rows, with each row displaying one instance of a node in the processing relationships structure, and one or more columns, with each column displaying one node identifier. The data in the rows and columns may be modifiable by a user of the system. New rows may be inserted in screen 170 by selecting an insertion point and selecting an insert function choice from screen 170. In this example, two rows have been inserted.

Each instance of a node in the functional relationship structure may be assigned a node identifier. The node identifier may be unique among other instances of the node. For example, in the processing relationship structure displayed in FIG. 6, the user may select the ISSUER node (row 1, level 1) and assign it a node identifier of 10. The user may then select the COMPANYA node (row 2, level 2) and assign it a node identifier of 1. The user may then select the REGION node (row 3, level 3) and assign it a node identifier of 10. The user may then select the BRANCH node (row 4, level 4) and select the "expand node" function choice from screen 150. Screen 170 may be displayed, with ISS column 172, COA column 174, RGN column 176, BRN column 178, and NODE NUM- BER column 179. Initially, no rows may be displayed, as no instances of the selected node may have been created. A row may be inserted in screen 170 by selecting an insertion point and selecting an "insert" function choice from screen 170. The node identifiers for the nodes may then be entered by the user. In one embodiment, one or more of the node identifiers may be automatically filled in by the process relationship configuration program upon inserting a new row. The processing relationship configuration program may then assign a unique node number (not to be confused with the node identifier) to the newly created node instance, and display the node number in NODE NUMBER column 179. In one embodiment, the user may not change the node numbers.

The combination of node identifiers assigned to an instance of a node may uniquely locate the node instance in the processing relationship structure. The node number may be used as an abbreviation for the combination of node identifiers. In the example illustrated in FIG. 7, two node instances are displayed. The first is defined by node identifier combination (ISS=10, COA=1, RGN=10, BRN=100), and is assigned the node number 4. The second is defined by node identifier combination (ISS=10, COA=1, RGN=10, BRN=200), and is assigned the node number 5.

In one embodiment, an FSO user may create a new instance of an existing object by using the create_new_instance method. Screen 170 may be displayed in response to an FSO user further identifying the values associated with the methods and properties of the new instance of the object (e.g. node 5 created as an instance of node 4). In one embodiment, the FSO user may identify specific values for ISS, COA, RGN, BRN which may be associated with the newly created object.

FIG. 8—One Embodiment of an Interactive Computer Display Screen for Creating Instances of a Second Object in a Processing Relationships Structure FIG. 8 illustrates one embodiment of a screen 170 for the user configuration of instances of nodes, or processing relationship objects, using a processing relationship configuration program in an FSO system. FIG. 8 is another example of screen 170 as illustrated in FIG. 7. FIG. 8 illustrates that different columns may be displayed for different nodes. In the example illustrated in FIG. 8, two node instances are displayed. The first is defined by node identifier combination (ACQ=20, COB 2, BNK=70, BRN=700), and is assigned the node number 20. The second is defined by node identifier combination (ACQ=20, COB 2, BNK=70, BRN=800), and is assigned the node number 21.

FIG. 9—An Example of One Embodiment of a Computer Model of a Multilevel Business Processing Relationship Illustrated in FIG. 2f, Wherein Values have been Assigned to the Objects in the Processing Relationship FIG. 9 illustrates one embodiment of a computer model of the multilevel processing relationship structure illustrated in FIG. 2f, showing the node identifiers assigned by a user, and the node numbers assigned by the processing relationship configuration program, to the nodes and node instances by the methods outlined in FIGS. 3 through 8. In the example shown in FIG. 9, the user has created instances of all the nodes, and assigned node identifiers to all of the nodes. All node instances have been assigned unique node numbers. Node 250, the root level node, and the only node on level zero, has been assigned a node number of 0. In one embodiment, the root level node may serve only as the root level node for the rest of the nodes in the processing relationship structure, and may not have an instance created. In one embodiment, nodes on level one may be specified as subsystem nodes. One instance of issuer node 252 at level one has been created and assigned a node identifier of 10 by the user, and a node number of 1 by the processing relationship configuration program. One instance of acquirer node 254 at level one has been created and assigned a node identifier of 20 by the user and a node number of 14 by the processing relationship configuration program.

In one embodiment, nodes at level two may be specified as Company nodes. At level two, under Issuer node instance 252, one instance of Company B node 256 has been created and assigned a node identifier of 2 by the user and a node number of 6 by the processing relationship configuration program. Also at level two, under Acquirer node instance 254, one instance of Company B node 270 has been created and assigned a node identifier of 2 by the user and a node number of 18 by the processing relationship configuration program. Node instances 256 and 270 illustrate that one entity in an organization may occur as multiple node instances in a processing relationship structure if the entity performs multiple functions in the processing relationship structure and therefore appears under multiple function node instances.

In one embodiment, nodes at levels three and lower may be specified as owner nodes, with a number attached to the owner tag indicating the level, with owner 1 at level three, owner 2 at level four, etc. At level three, one instance of Non-risk node 260 has been created and assigned a node identifier of 20 by the user and a node number of 7 by the processing relationship configuration program. Also at level three, one instance of Bank node 258 has been created and assigned a node identifier of 30 by the user and a node number of 10 by the processing relationship configuration program. At level four, one instance of Bank node 262 has been created and assigned a node identifier of 399 by the user and a node number of 8 by the processing relationship configuration program. At level five, one instance of Branch node 264 has been created and assigned a node identifier of 500 by the user and a node number of 9 by the processing relationship configuration program.

Branch node instances 266A and 266B illustrate the creation of multiple instances of a node by a user. Branch node instance 266A has been assigned a node identifier of 700 by the user and a node number of 20 by the processing relationship configuration program. Branch node instance 266B has been assigned a node identifier of 700 by the user and a node number of 20 by the processing relationship configuration program.

Accounts in an FSO system may be associated with node instances in the processing relationship structure. In one embodiment, an account may be associated with only one node instance. Node instance information may be stored in the account master files, and also may be attached to transactions, files, database records, database tables, and other FSO data objects associated with the accounts. In some embodiments, an account master file or other FSO data object associated with the account may include the entire node identifier permutation that uniquely identifies the node in the tree. In some embodiments, an account master file or other FSO data object associated with the account may include the node number that uniquely identifies the node instance associated with the account.

In FIG. 9, examples of account types include customer accounts 265, which are accounts for individuals who do business with the FSO, and merchant accounts 267, which are accounts for merchant businesses who do business with the FSO. In one embodiment, accounts may be associated with node instances at any level of the processing relationship structure. In some embodiments, accounts may not be associated with node instances at one or more levels of the processing relationship structure.

Figure 11:
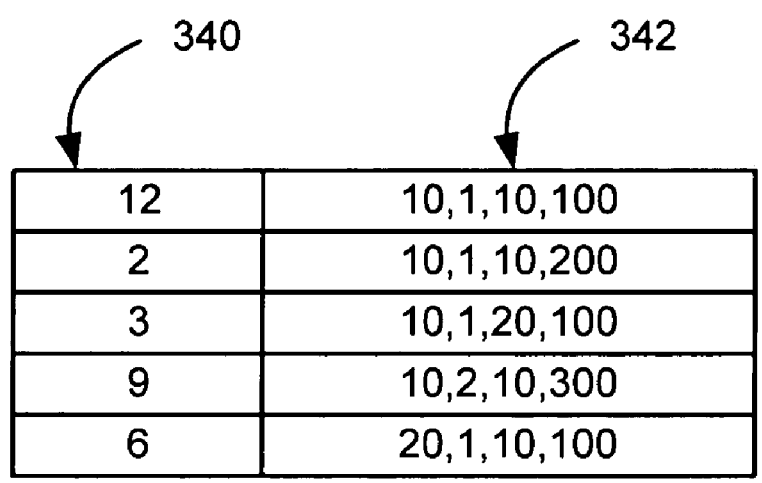
FIG. 11 is an embodiment of a database table in the FSO system that may be used to store node identifier permutations and node numbers.

In one embodiment, a database table in the FSO system may be used to store the node identifier permutations and node numbers for all of the node instances in a processing relationship structure, as illustrated in further detail in FIG. 11. The database table may be used in the FSO system as a lookup table to convert between node numbers and node identifier permutations. The node number may serve in the FSO system as an abbreviation of the node identifier permutation, and allows the node instance associated with an account to be identified in FSO data objects using a minimum of space. The node identifier permutation may be used in user interfaces, output files, etc. to identify node instances to the user, as this may be the form a user is most likely to recognize and understand.

FIGS. 10A-10d—Various Flow Charts Illustrating One Embodiment of a Method of Configuring Processing Relationships for Use in Various FSO Application Software Programs FIGS. 10a-10d include various flow charts illustrating one embodiment of a method of configuring processing relationships for use in various FSO application software programs, such as a report program.

Figure 10A:
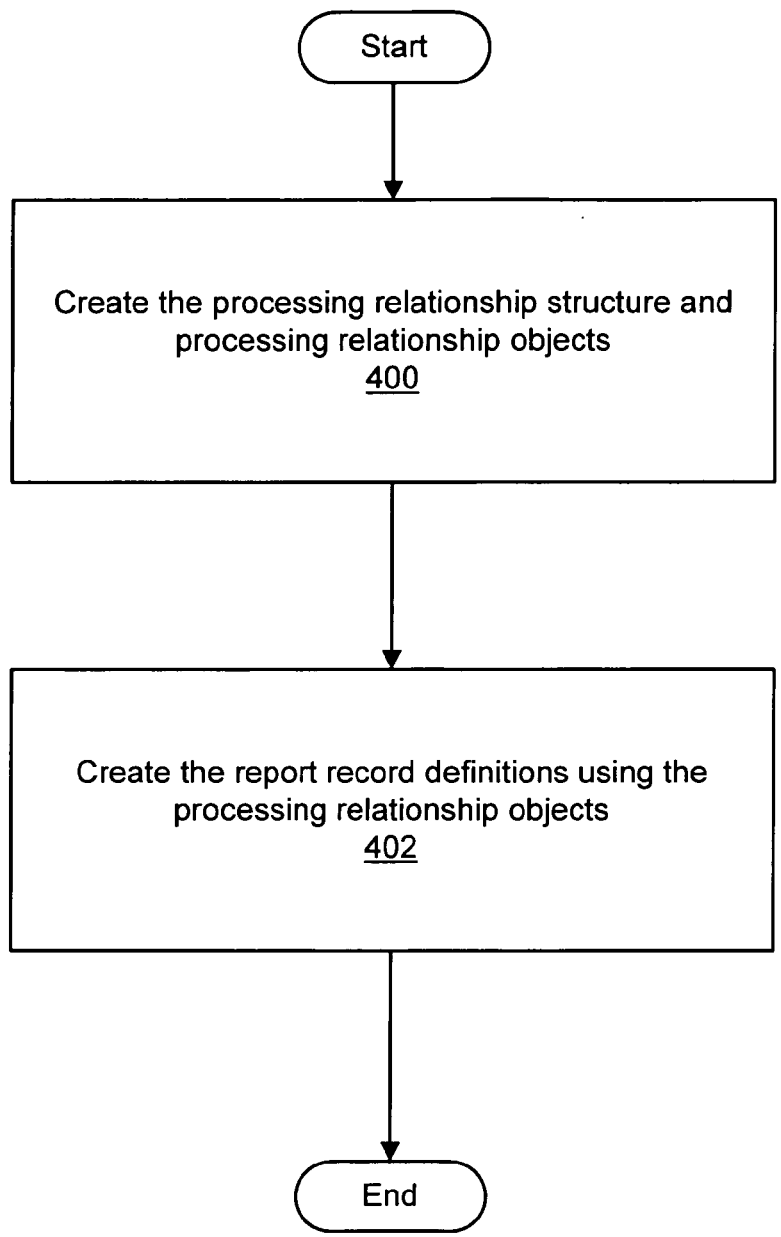
FIG. 10*a* is a high-level flow chart illustrating one embodiment of a method of configuring processing relationships for use in configuring reports in an FSO system.
Figure 10B:
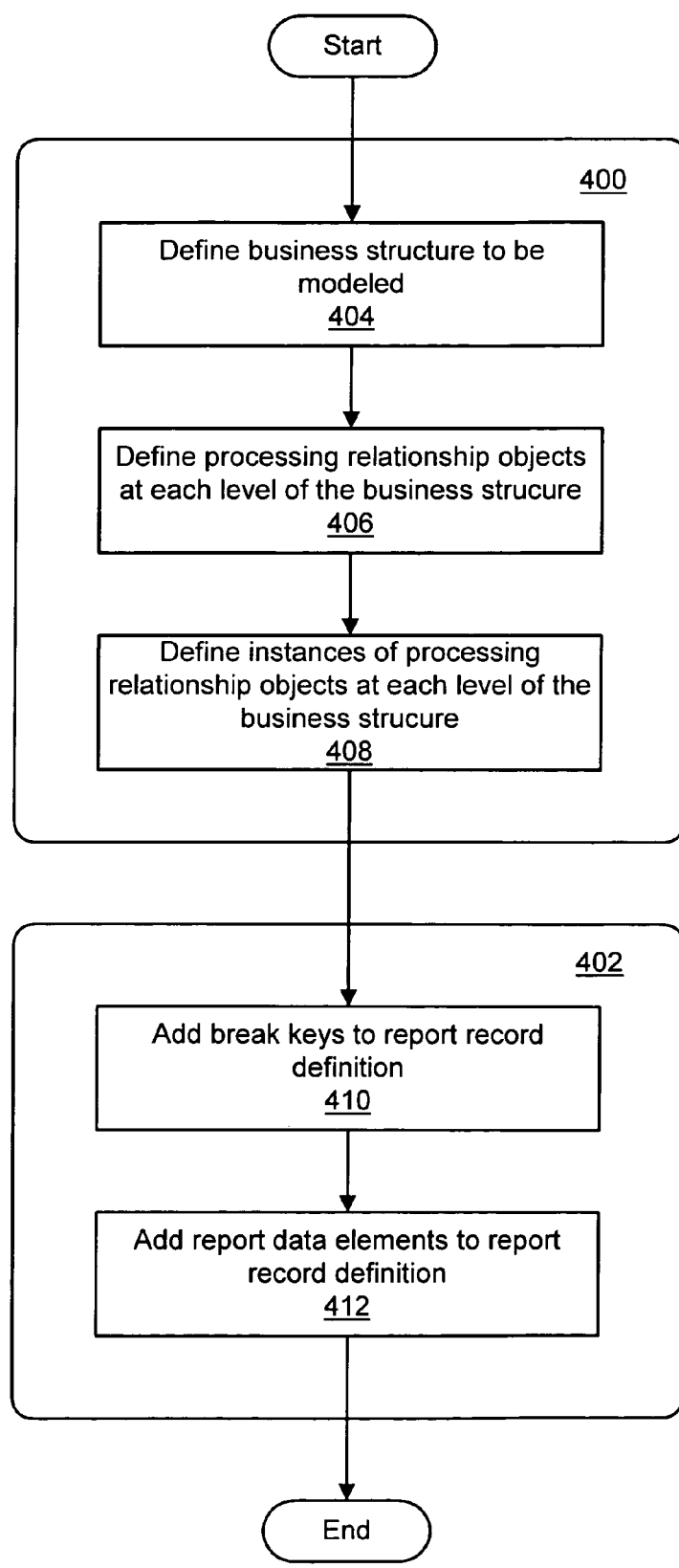
FIG. 10*b* is a mid-level flow chart illustrating one embodiment of a method of configuring processing relationships for use in configuring reports in an FSO system.
Figure 10C:
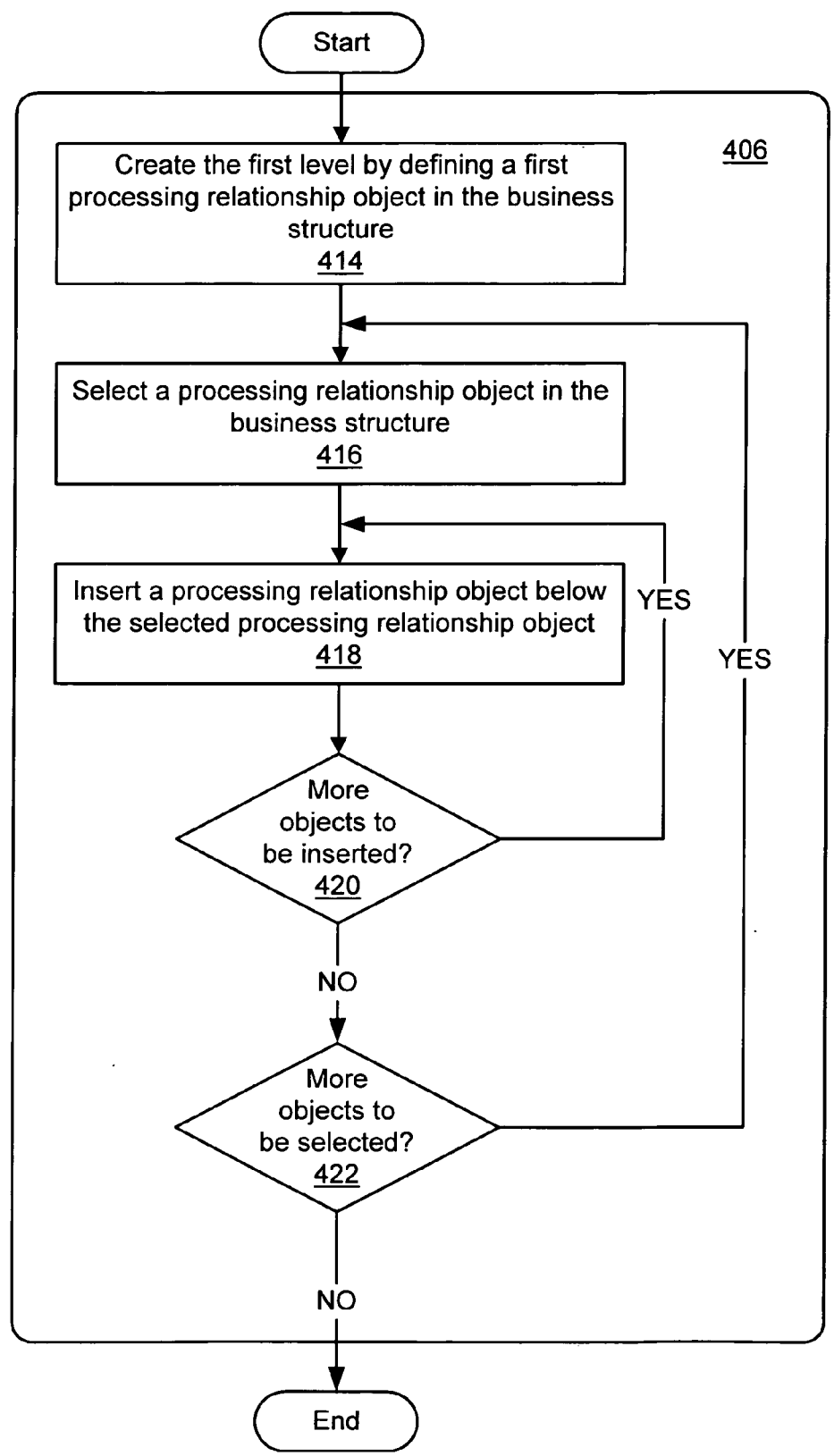
FIG. 10*c* is a detailed flow chart illustrating one embodiment of a method of defining processing relationship objects and arranging them in a processing relationship model.
Figure 10D:
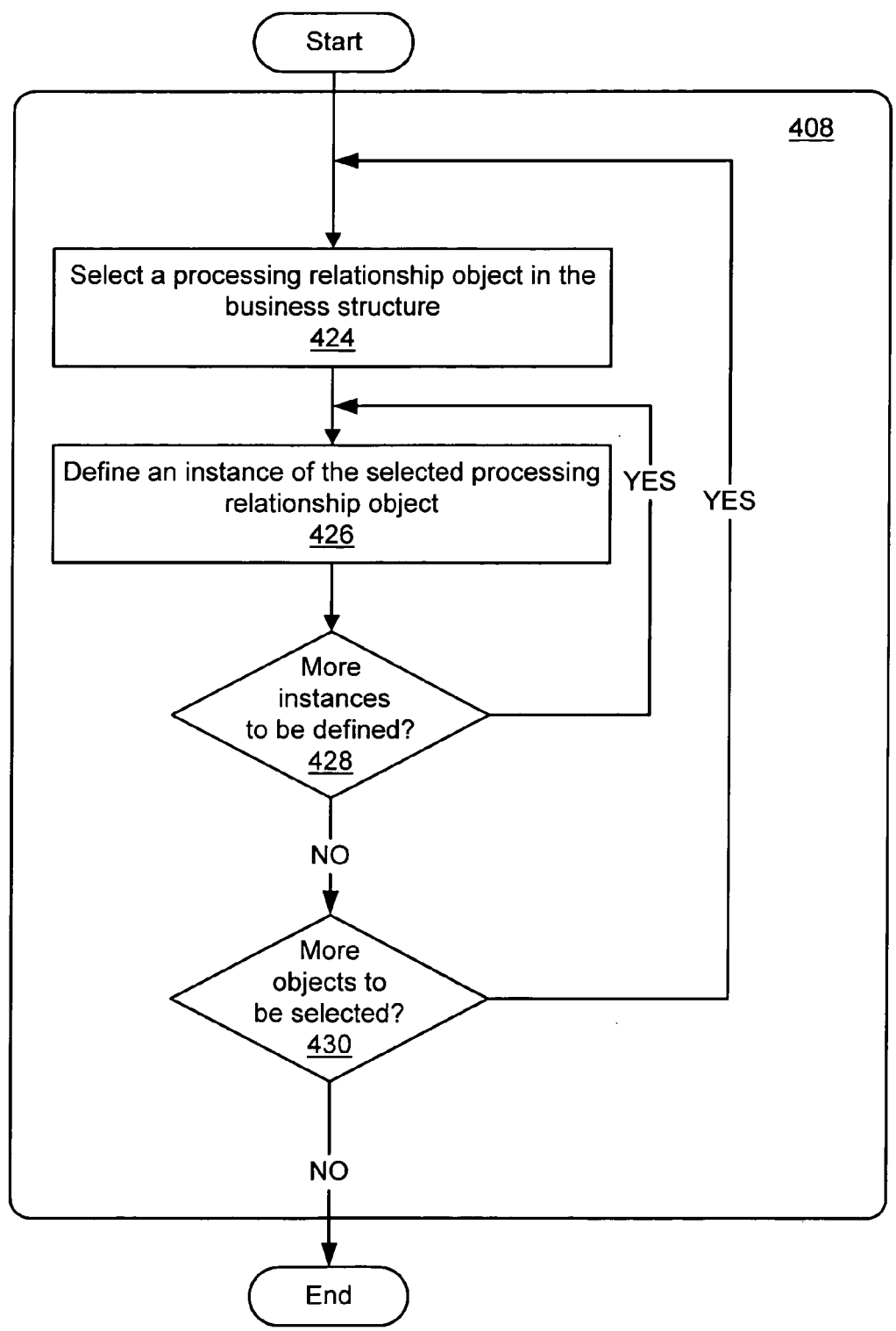
FIG. 10*d* is a detailed flow chart illustrating one embodiment of a method of defining instances of the processing relationship objects defined in FIG. 10*c*.

FIG. 10a—A High-Level Flow Chart Illustrating One Embodiment of a Method of Configuring Processing Relationships for Use in Configuring Reports in an FSO System FIG. 10a is a flowchart illustrating one embodiment of a method of creating a processing relationship structure using the processing relationship configuration program, and of then using the node instances created in the processing relationship structure in an FSO runtime system in report record definitions to generate reports based on the processing relationship structure. In step 400, the processing relationship configuration program is used by a user of the FSO system to configure the processing relationship structure and the nodes and node instances therein. In step 402, the user may add one or more node instances to report record definitions, which may then be used to extract, sort, and/or collate reports based upon the processing relationship structure. FIGS. 10b-10d expand on the flowchart illustrated in FIG. 10a.

FIG. 10b—A Mid-Level Flow Chart Illustrating One Embodiment of a Method of Configuring Processing Relationships for Use in Configuring Reports in an FSO System FIG. 10b is a flowchart illustrating one embodiment of a method of creating a processing relationship structure using the processing relationship configuration program, and of then using the node instances created in the processing relationship structure in an FSO runtime system in report record definitions to generate reports based on the processing relationship structure. FIG. 10b expands on the flowchart illustrated in FIG. 10a; steps 400 and 402 have been expanded into several steps.

In step 404, one or more persons may first define the business structure of the FSO to be modeled in a processing relationship structure. After the business structure has been defined, a processing relationship structure may be configured using the processing relationship configuration program. In step 406, a user may define the processing relationship objects, or nodes, at each level of the processing relationship structure. The process of defining the nodes at each level of the structure, and of defining descendents of the nodes at the next level, in effect creates the processing relationship structure. In step 408, the user may then select processing relationship nodes in the processing relationship structure and create instances of the nodes by assigning node identifiers to the nodes. A node identifier may uniquely define a node instance within the processing relationship structure, and may define the relationship of the node instance with node instances above it in the processing relationship structure.

In step 410 and 412, report record definitions may be defined. A report record definition is a data structure that defines the format of report records in an FSO system. A report record may be defined as a data record including break key values and one or more data values. A report record may also include other data such as header data, sequencing information, time stamps, etc. Break key values in a report record may be used to sort the report records by one or more of the break key values, thus ordering the report records in a logical sequence by one or more of the break key fields. The break key values may then be used when generating a report to collate the report by one or more of the break key fields. When generating reports, a collection of data records, such as transaction log records, transaction records, account master files, etc., may be processed, with one or more report records extracted from the collection of data records using the report record definition for the report to be generated. In some embodiments, one report record may be generated for each data record processed.

In step 410, a user may add break keys to a report record definition. Break keys are fields in the report record definition that are used to extract data values from transaction records, account master files, or other data sources, and to assign the extracted data values to break key fields in a report record. The report record definition may also include one or more data field definitions which may be used to extract data values from data elements in transaction records, account master files, or other data sources, and to assign the extracted data values to report data fields in a report record. The data field definitions may be added to the report record definition in step 412.

Processing relationship node identifiers may be used in report record definitions as break key fields. In one embodiment, node numbers may be used as an abbreviation for node identifiers in break key fields. A data record for which a report record is generated for a report may be associated with an account in the processing relationship structure. The data record may include a processing relationship node identifier and/or node number that may be used to link the data record to the account in the processing relationship structure. Using processing relationship node identifiers as break key fields in report record definitions may allow reports to be sorted and collated according to the processing relationship structure. This may allow individual reports to be automatically generated for business entities and FSO functional areas based upon the processing relationship structure. Rollup and summary reports may also be generated. As the report records including node instances are processed into reports, summary data may be compiled from the data fields within the report records. When a change, or break, in the key field values for the node instances is encountered, a summary report for all node instances at that level, for that branch of the processing relationship structure, may be generated. A report may continue this process for the entire processing relationship structure, thus generating summary reports for the entire FSO processing relationship as defined in the structure.

FIG. 10c—A Detailed Flow Chart Illustrating One Embodiment of a Method of Defining Processing Relationship Objects and Arranging them in a Processing Relationship Model FIG. 10c is a flowchart illustrating one embodiment of a method of creating a processing relationship structure using the processing relationship configuration program. FIG. 10c is an expansion of step 406 from the flowchart illustrated in FIG. 10b. In step 414, a user may initialize a new processing relationship structure by creating a processing relationship object, or node, at the first level. In one embodiment, a GUI in the processing relationship configuration program may provide a method of creating a new processing relationship structure. For example, a "create new processing relationship structure" menu choice may be available to the user. In one embodiment, creating a new processing relationship structure may automatically create a first node at a first level of the processing relationship. In one embodiment, this first node may be a system node that represents the highest level in the FSO processing relationship structure. In one embodiment, all other nodes in the processing relationship structure are created as descendents of the first node. The first node may be assigned a unique node number by the processing relationship configuration program. In one embodiment, the node at the first level may be assigned a node number of 0. In one embodiment, the first level may be level 0.

In one embodiment, nodes created in the processing relationship structure may be displayed on a processing relationship configuration screen by the processing relationship configuration program. In one embodiment, one row may be displayed for each node in the processing relationship structure. The row may include fields for displaying and entering information about the node. Fields in the row may include a sequence field, a element ID constant field, a level field, an element ID field, an abbreviation field, and/or a description field. A sequence field may display a sequence number for the row in the screen. An element ID constant field may be used to enter, display, and edit a textual identifier for the node. A level field may be used to display the level of a node in the processing relationship structure. An element ID field may be used to enter, display, and edit an alphanumeric database identifier for the node. An abbreviation field may be used to enter, display, and edit a short, for example three characters, label for the node. A description field may be used to enter, display, and edit a textual description of the node. The rows in the screen may also include other information about the node not described wherein.

In step 416, the user may select the first node created in step 414 on the processing relationship configuration screen in preparation for adding nodes at the second level as descendents of the first node. Selecting a node on the processing relationship configuration screen may be accomplished using one of a variety of methods, including standard GUI methods such as mouse highlighting and selection. The processing relationship configuration screen may include one or more function choices. For example, the screen may include insert node, delete node, edit node, and expand node function choices. Function choices may be selectable in a variety of methods, including standard GUI methods such as buttons, menus, text boxes, and mouse highlighting and selection.

In step 418, after the first processing node is selected, the user may insert a node at the second level as a descendent of the first node. The user may invoke an "insert node" function after selecting the first node. A new row representing the newly created node may be displayed immediately below the first node's row. The user may then insert data in one or more of the fields in the row to configure the new node. Some of the fields in the row may be automatically filled in by the processing relationship configuration program upon creating the new node. In step 420, the user determines if there are more nodes to be inserted at the second level as a descendent of the first node. If so, steps 418 and 420 are repeated. If no more nodes are to be added at the second level as descendents of the first node, the first node may be deselected by the user.

In step 422, the user may determine if nodes are to be added as descendents of any node already created in the processing relationship structure. If more nodes are to be added, the user proceeds to step 416 to select a node for which descendent nodes are to be added. Steps 416-422 may be repeated by the user until all processing relationship nodes in the processing relationship structure have been created and configured.

FIG. 10d—A Detailed Flow Chart Illustrating One Embodiment of a Method of Defining Instances of the Processing Relationship Objects Defined in FIG. 10c FIG. 10d is a flowchart illustrating one embodiment of a method of creating a processing relationship structure using the processing relationship configuration program.

FIG. 10d is an expansion of step 408 from the flowchart illustrated in FIG. 10b. In step 424, the user may select a node displayed on the processing relationship configuration screen in preparation for adding node instances for the node. In one embodiment, nodes created in the processing relationship structure may be displayed on the processing relationship configuration screen by the processing relationship configuration program. In one embodiment, one row may be displayed for each node in the processing relationship structure. The row may include fields for displaying and entering information about the node. Selecting a node on the processing relationship configuration screen may be accomplished using one of a variety of methods, including standard GUI methods such as mouse highlighting and selection. The processing relationship configuration screen may include one or more function choices. For example, the screen may include insert node, delete node, edit node, and/or expand node function choices. Function choices may be selectable in a variety of methods, including standard GUI methods such as buttons, menus, text boxes, and mouse highlighting and selection.

In step 426, after node is selected, the user may add instances of the node. The user may invoke an "expand node" function after selecting the first node. In response to the "expand node" function being invoked, the processing relationship configuration program may open a node instance configuration screen. The screen may include one or more function choices. For example, the screen may include insert row, delete row, and/or edit row function choices. Function choices may be selectable in a variety of methods, including standard GUI methods such as buttons, menus, text boxes, and mouse highlighting and selection. The screen may include one or more rows, with each row displaying one instance of a node in the processing relationships structure, and one or more columns, with each column displaying one node identifier. The data in the rows and columns may be modifiable by a user of the system. A new instance of the node may be created by inserting a new row in the screen. New rows may be inserted in the screen by selecting an insertion point and selecting an "insert function" choice from the screen.

Initially, no rows may be displayed, as no instances of the expanded node may have been created. A row may be inserted in by selecting an insertion point and selecting an "insert" function choice from the screen. The node identifiers for the nodes may then be entered by the user. In one embodiment, one or more of the node identifiers may be automatically filled in by the process relationship configuration program upon inserting a new row. The processing relationship configuration program may then assign a unique node number (not to be confused with the node identifier) to the newly created node instance, and display the node number in a column of the node instance row. In one embodiment, the user may not change the node number. The combination of node identifiers assigned to an instance of a node uniquely locate the node instance in the processing relationship structure. The node number may be used as an abbreviation for the combination of node identifiers. In one embodiment, the node identifiers assigned to an instance of a node may be read from left to right, with the leftmost being the node identifier of the highest node on the branch of the processing relationship structure the new node instance is on. The rightmost node identifier may be the node identifier of the newly created node, and may be assigned and edited by the user. Nodes between the leftmost node and rightmost node may be node identifiers of the ancestors of the node instance on the branch of the processing relationship structure. In one embodiment, the user may assign and edit the node identifiers of ancestor nodes. Other embodiments of ordering schemes for the node identifiers may be used, such as right-to-left, top-to-bottom (vertical arrangement), etc.

In step 428, the user determines if any more node instances are to be created for the currently selected node. If there are more node instances to be created for the currently selected node, step 426 may be repeated until all the node instances have been created. If there are no more node instances to be created for the currently selected node, the user may determine if node instances remain to be created for any other nodes in the processing relationship structure. If there are more node instances to be created, the user may repeat steps 424-428 until all node instances for all nodes have been created.

FIG. 11—An Embodiment of a Database Table in the FSO System that may be Used to Store Node Identifier Permutations and Node Numbers FIG. 11 illustrates an embodiment of a database table in the FSO system that may be used to store the node identifier permutations 342 and node numbers 340 for all of the node instances in a processing relationship structure. The database table may be used in the FSO system as a lookup table to convert between node numbers 340 and node identifier permutations 342. The node number 340 may serve in the FSO system as an abbreviation of the node identifier permutation 342, and allows the node instance associated with an account to be identified in FSO data objects using a minimum of space. The node identifier permutation may be used in user interfaces, output files, etc. to identify node instances to the user, as this may be the form a user is most likely to recognize and understand.

A processing relationship node number data element may be used as a key field in key definitions. The key definition may be used to search for processing parameters in the FSO system database. Since a node number uniquely identifies a node instance in the processing relationship structure, and one or more of the node identifier(s) that are associated with the node number may be changed without changing the node number, key definitions do not have to be modified when one or more node identifier(s) in the processing relationship structure are changed. This may isolate the FSO application software program source code from changes when the processing relationship structure may have changed.

In one embodiment, a processing relationship node number may be logged with a transaction record when the transaction is closed or written to a logfile, wherein the processing relationship node number uniquely identifies a processing relationship node instance in the processing relationship structure. The processing relationship node number in the transaction record may then be used by the system to identify the owner of the transaction record's account in the processing relationship structure.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for processing Financial Service Organization (FSO) transactions, comprising:
    displaying at least two processing relationship object representations on a display screen in data communication with a Financial Service Organization (FSO) computer system comprising a database;
    creating a model of an FSO comprising a plurality of processing relationship software objects, wherein creating the model of the FSO comprises:
        selecting at least two processing relationship object representations from the displayed processing relationship object representations; and
        preparing a processing relationship definition for at least two of the selected processing relationship object representations, wherein preparing the processing relationship definitions includes:
            creating a highest level processing relationship object in a processing relationship structure, wherein the highest level processing relationship object represents an FSO; and
            creating a plurality of lower level processing relationship objects in the processing relationship structure, wherein the plurality of lower level processing relationship objects in the processing relationship structure are descendents of the highest level processing relationship object, wherein one or more of the lower level processing relationship objects represents an FSO physical entity that has a physical presence or manifestation, wherein the FSO physical entity is a bank branch office or a bank regional office, wherein one or more of the other lower level processing relationship objects represents a functional area, wherein the functional area is a credit card issuer or an acquirer of credit card payments;
    storing each processing relationship definition in the database; and
    the FSO computer system processing a credit card transaction using at least one processing relationship definition of the prepared processing relationship definitions, wherein the at least one processing relationship definition includes at least one lower level relationship object representing the FSO physical entity.

2. The method of claim 1, wherein each processing relationship definition stored in the database is configured for use in preparing a processing relationship value from Financial Services Organization (FSO) transaction-related data in the FSO computer system.

3. The method of claim 2, wherein the processing relationship value is configured for use in identifying an FSO business entity as an owner of the FSO transaction-related data.

4. The method of claim 2, wherein the processing relationship value is configured for use in identifying an FSO business entity as an owner of the FSO transaction-related data, wherein the FSO business entity is a bank branch office or a regional bank or a credit card line or an issuer or an acquirer.

5. The method of claim 1, wherein the selecting one or more processing relationship object representations is performed by a user of the FSO computer system.

6. The method of claim 1, wherein the selecting one or more processing relationship object representations is programmable or executable by an expert system.

7. The method of claim 1, wherein the storing the processing relationship definition in the database comprises transferring the processing relationship definition to a report record definition stored in the database.

8. The method of claim 1, wherein the processing relationship structure is expanded by inserting one or more processing relationship objects as descendants of the highest level processing relationship object.

9. The method of claim 1, wherein the processing relationship structure is edited by inserting or deleting one or more processing relationship objects.

10. The method of claim 1, wherein the displaying one or more processing relationship object representations on a display screen comprises displaying values associated with a sequence number for at least one of the plurality of lower level processing relationship objects and a level number for the at least one lower level processing relationship object, wherein the level number identifies a level in the processing relationship structure.

11. The method of claim 1, wherein the displaying one or more processing relationship object representations on a display screen comprises displaying values associated with an object name, an object description and an object number for a displayed processing relationship object.

12. The method of claim 11, wherein the object name identifies a unique name assigned to an object.

13. The method of claim 1, wherein the database is relational or object oriented.

14. The method of claim 1, wherein the selecting a first processing relationship object representation from one or more processing relationship object representations comprises positioning a cursor of an user input device above the first processing relationship object representation and clicking a button of the user input device.

15. The method of claim 1, wherein the preparing a processing relationship definition comprises creating or editing an object associated with each of the selected processing relationship object representations.

16. The method of claim 15, wherein the creating the object comprises identifying one or more values and one or more properties.

17. The method of claim 1, wherein the preparing a processing relationship definition comprises identifying one or more properties of an object associated with each of the selected processing relationship object representations.

18. The method of claim 1, wherein the processing relationship object representations comprises an icon displayed on the display screen of the FSO computer system.

19. The method of claim 1, wherein a user of the FSO computer system executes a processing relationship configuration program to prepare the processing relationship definition.

20. The method of claim 1, wherein the user of FSO computer system executes a processing relationship configuration program to reconfigure and store in the database the processing relationship definition in response to changing business conditions.

21. The method of claim 1, wherein the plurality of lower level processing relationship objects comprises a credit card issuer object representing a credit card issuer and an acquirer object representing an acquirer, and wherein each of the credit card issuer object and the acquirer object has one or more descendent processing relationship objects.

22. The method of claim 1, wherein at least one of the one or more descendent processing relationship objects is a descendent of at least two precedent processing relationship objects, and wherein the at least two precedent processing relationship objects are at the same level in the processing relationship structure.

23. The method of claim 1, wherein at least one of the one or more descendent processing relationship objects represents a credit card issuer or an acquirer.

24. The method of claim 1, wherein at least one of the one or more descendent processing relationship objects represents a bank branch.

25. The method of claim 1, wherein displaying the at least two processing relationship object representations comprises displaying a row for each of at least two processing relationship objects, wherein each of the rows comprises an object identifier and a level number, wherein the descendants of each object appear directly below that object.

26. The method of claim 25, wherein the processing relationship structure is expanded by inserting one or more rows until a processing relationship structure has been fully defined.

27. A system for processing FSO transactions, the system comprising:
  a computer program; and
  a computer system, wherein the computer program is executable on the computer system to execute:
    displaying at least two processing relationship object representations on a display screen in data communication with a Financial Service Organization (FSO) computer system comprising a database;
    creating a model of an FSO comprising a plurality of processing relationship software objects, wherein creating the model of the FSO comprises:
    selecting at least two processing relationship object representations from the displayed processing relationship object representations; and
    preparing a processing relationship definition for at least two of the selected processing relationship object representations, wherein preparing the processing relationship definitions comprises:
      creating a highest level processing relationship object in a processing relationship structure, wherein the highest level processing relationship object represents an FSO; and
      creating a plurality of lower level processing relationship objects in the processing relationship structure, wherein the plurality of lower level processing relationship objects in the processing relationship structure are descendents of the highest level processing relationship object, wherein one or more of the lower level processing relationship objects represents an FSO physical entity that has a physical presence or manifestation, wherein the FSO physical entity is a bank branch office or a bank regional office, wherein one or more of the other lower level processing relationship objects represents a functional area, wherein the functional area is a credit card issuer or an acquirer of credit card payments;

storing each processing relationship definition in the database; and processing a credit card transaction using at least one processing relationship definition of the prepared processing relationship definitions, wherein the at least one processing relationship definition includes at least one lower level processing relationship object representing the FSO physical entity.

28. The system of claim 27, wherein each processing relationship definition stored in the database is configured for use in preparing a processing relationship value from Financial Services Organization (FSO) transaction-related data in the FSO computer system.

29. The system of claim 28, wherein the processing relationship value is configured for use in identifying an FSO business entity as an owner of the FSO transaction-related data.

30. The system of claim 29, wherein the processing relationship value is configured for use in identifying an FSO business entity as an owner of the FSO transaction-related data, wherein the FSO business entity is a bank branch office or a regional bank or a credit card line or an issuer or an acquirer.

31. The system of claim 27, wherein the selecting one or more processing relationship object representations is performed by a user of the FSO computer system.

32. The system of claim 27, wherein the selecting one or more processing relationship object representations is programmable or executable by an expert system.

33. The system of claim 27, wherein the storing the processing relationship definition in the database comprises transferring the processing relationship definition to a report record definition stored in the database.

34. The system of claim 27, wherein the processing relationship structure is expanded by inserting one or more processing relationship objects as descendents of the highest level processing relationship object.

35. The system of claim 27, wherein the processing relationship structure is edited by inserting or deleting one or more processing relationship objects.

36. The system of claim 27, wherein the displaying one or more processing relationship object representations on a display screen comprises displaying values associated with a sequence number for at least one of the plurality of lower level processing relationship objects and a level number for the at least one lower level processing relationship object, wherein the level number identifies a level in the processing relationship structure.

37. The system of claim 27, wherein the displaying one or more processing relationship object representations on a display screen comprises displaying values associated with an object name, an object description and an object number for a displayed processing relationship object.

38. The system of claim 37, wherein the object name identifies a unique name assigned to an object.

39. The system of claim 27, wherein the database is relational or object oriented.

40. The system of claim 27, wherein the selecting a first processing relationship object representation from one or more processing relationship object representations comprises positioning a cursor of an user input device above the first processing relationship object representation and clicking a button of the user input device.

41. The system of claim 27, wherein the preparing a processing relationship definition comprises creating or editing an object associated with each of the selected processing relationship object representations.

42. The system of claim 41, wherein the creating the object comprises identifying one or more values and one or more properties.

43. The system of claim 27, wherein the preparing a processing relationship definition comprises identifying one or more properties of an object associated with each of the selected processing relationship object representations.

44. The system of claim 27, wherein the processing relationship object representations comprises an icon displayed on the display screen of the FSO computer system.

45. The system of claim 27, wherein a user of the FSO computer system executes a processing relationship configuration program to prepare the processing relationship definition.

46. The system of claim 27, wherein the user of FSO computer system executes a processing relationship configuration program to reconfigure and store in the database the processing relationship definition in response to changing business conditions.

47. The system of claim 27, wherein the computer system comprises a display device coupled to the computer system to display data.

48. The system of claim 47, wherein the display device is a display screen.

49. The system of claim 27, wherein the computer system comprises a user input device coupled to the computer system to enter data.

50. The system of claim 49, wherein the user input device is a mouse or a keyboard.

51. A computer readable storage medium comprising program instructions stored thereon, wherein the program instructions are executable by a computer system to implement:

displaying at least two processing relationship object representations on a display screen in data communication with a Financial Service Organization (FSO) computer system comprising a database;

creating a model of an FSO comprising a plurality of processing relationship software objects, wherein creating the model of the FSO comprises:

selecting at least two processing relationship object representations from the displayed processing relationship object representations; and preparing a processing relationship definition for at least two of the selected one or more processing relationship object representations, wherein preparing the processing relationship definitions comprises:

creating a highest level processing relationship object in a processing relationship structure, wherein the highest level processing relationship object represents an FSO; and creating a plurality of lower level processing relationship objects in the processing relationship structure, wherein the plurality of lower level processing relationship objects in the processing relationship structure are descendents of the highest level processing relationship object, wherein one or more of the lower level processing relationship objects represents an FSO physical entity that has a physical presence or manifestation, wherein the FSO physical entity is a bank branch office or a bank regional office, wherein one or more of the other lower level processing relationship objects represents a functional area, wherein the functional area is a credit card issuer or an acquirer of credit card payments;

storing each processing relationship definition in the database; and processing a credit card transaction using at least one processing relationship definition of the prepared processing relationship definitions, wherein the at least one processing relationship definition includes at least one lower level processing relationship object representing the FSO physical entity.

52. The computer readable storage medium of claim 51, wherein each processing relationship definition stored in the database is configured for use in preparing a processing relationship value from Financial Services Organization (FSO) transaction-related data in the FSO computer system.

53. The computer readable storage medium of claim 52, wherein the processing relationship value is configured for use in identifying an FSO business entity as an owner of the FSO transaction-related data.

54. The computer readable storage medium of claim 53, wherein the processing relationship value is configured for use in identifying an FSO business entity as an owner of the FSO transaction-related data, wherein the FSO business entity is a bank branch office or a regional bank or a credit card line or an issuer or an acquirer.

55. The computer readable storage medium of claim 51, wherein the selecting one or more processing relationship object representations is performed by a user of the FSO computer system.

56. The computer readable storage medium of claim 51, wherein the selecting one or more processing relationship object representations is programmable or executable by an expert system.

57. The computer readable storage medium of claim 51, wherein the storing the processing relationship definition in the database comprises transferring the processing relationship definition to a report record definition stored in the database.

58. The computer readable storage medium of claim 51, wherein the processing relationship structure is expanded by inserting one or more processing relationship objects as descendents of the highest level processing relationship object.

59. The computer readable storage medium of claim 51, wherein the processing relationship structure is edited by inserting or deleting one or more processing relationship objects.

60. The computer readable storage medium of claim 51, wherein the displaying one or more processing relationship object representations on a display screen comprises displaying values associated with a sequence number for at least one of the plurality of lower level processing relationship objects and a level number for the at least one lower level processing relationship object, wherein the level number identifies a level in the processing relationship structure.

61. The computer readable storage medium of claim 51, wherein the displaying one or more processing relationship object representations on a display screen comprises displaying values associated with an object name, an object description and an object number for a displayed processing relationship object.

62. The computer readable storage medium of claim 61, wherein the object name identifies a unique name assigned to an object.

63. The computer readable storage medium of claim 51, wherein the database is relational or object oriented.

64. The computer readable storage medium of claim 51, wherein the selecting a first processing relationship object representation from one or more processing relationship object representations comprises positioning a cursor of an user input device above the first processing relationship object representation and clicking a button of the user input device.

65. The computer readable storage medium of claim 51, wherein the preparing a processing relationship definition comprises creating or editing an object associated with each of the selected processing relationship object representations.

66. The computer readable storage medium of claim 65, wherein the creating the object comprises identifying one or more values and one or more properties.

67. The computer readable storage medium of claim 51, wherein the preparing a processing relationship definition comprises identifying one or more properties of an object associated with each of the selected processing relationship object representations.

68. The computer readable storage medium of claim 51, wherein the processing relationship object representations comprises an icon displayed on the display screen of the FSO computer system.

69. The computer readable storage medium of claim 51, wherein a user of the FSO computer system executes a processing relationship configuration program to prepare the processing relationship definition.

70. The computer readable storage medium of claim 51, wherein the user of FSO computer system executes a processing relationship configuration program to reconfigure and store in the database the processing relationship definition in response to changing business conditions.

* * * * *